United States Patent
Togino

(10) Patent No.: US 6,278,556 B1
(45) Date of Patent: Aug. 21, 2001

(54) PRISM OPTICAL SYSTEM

(75) Inventor: Takayoshi Togino, Koganei (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/458,704

(22) Filed: Dec. 13, 1999

Related U.S. Application Data

(62) Division of application No. 08/917,695, filed on Aug. 26, 1997, now Pat. No. 6,008,948.

(30) Foreign Application Priority Data

Aug. 28, 1996 (JP) .................................................. 8-226416
Jan. 6, 1997 (JP) .................................................. 9-000179

(51) Int. Cl.[7] .................................................. G02B 27/14
(52) U.S. Cl. .................. 359/637; 359/633; 359/627; 359/730; 396/352
(58) Field of Search .................................... 359/637, 631, 359/633, 627, 730, 731; 396/352; 353/70

(56) References Cited

U.S. PATENT DOCUMENTS

| 3,810,221 | 5/1974 | Plummer . | |
|---|---|---|---|
| 3,836,931 | 9/1974 | Plummer | 396/352 |
| 5,274,406 | 12/1993 | Tejima et al. | 353/70 |
| 5,663,833 | 9/1997 | Nanba et al. | 359/631 |
| 6,008,948 | * 12/1999 | Togino | 359/637 |
| 6,084,715 | * 7/2000 | Aoki et al. | 359/627 |
| 6,147,808 | * 11/2000 | Togino | 359/637 |
| 6,166,858 | * 12/2000 | Togino et al. | 359/633 |
| 6,178,048 | * 1/2001 | Togino et al. | 359/637 |
| 6,178,052 | * 1/2001 | Aoki et al. | 359/730 |

FOREIGN PATENT DOCUMENTS 722 106   7/1996   (EP) .

* cited by examiner

*Primary Examiner*—Loha Ben
(74) *Attorney, Agent, or Firm*—Pillsbury Winthrop LLP

(57) ABSTRACT

The invention provides a prism optical system which has an image-forming action and provides a clear yet substantially undistorted image at a wide field angle. In a prism optical system 5 comprising an aperture 1 and having an action on erecting an image formed by an objective, there are provided reflecting surfaces 31, 32, 33, 41, 42, and 43 for image inversion, each of which is constructed of a curved surface having a power, and is in an irrotationally symmetric plane shape having no rotationally symmetric axis both within and outside the surface, so that decentering aberration produced by reflection of light at the curved surfaces can be corrected.

19 Claims, 17 Drawing Sheets

Coordinate system of first prism

Coordinate system of first prism

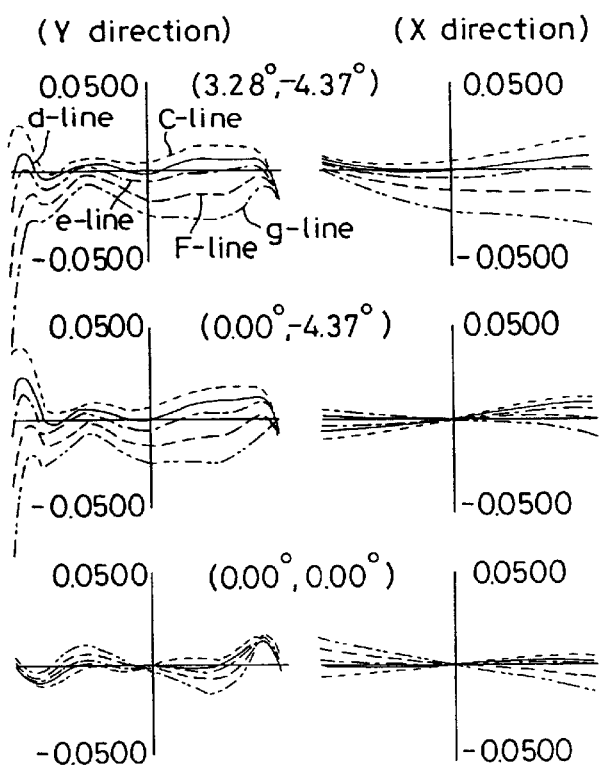
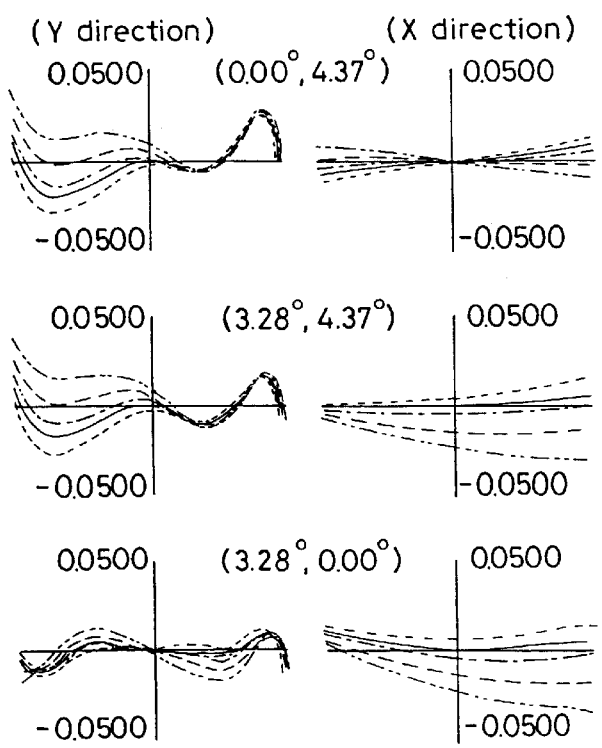

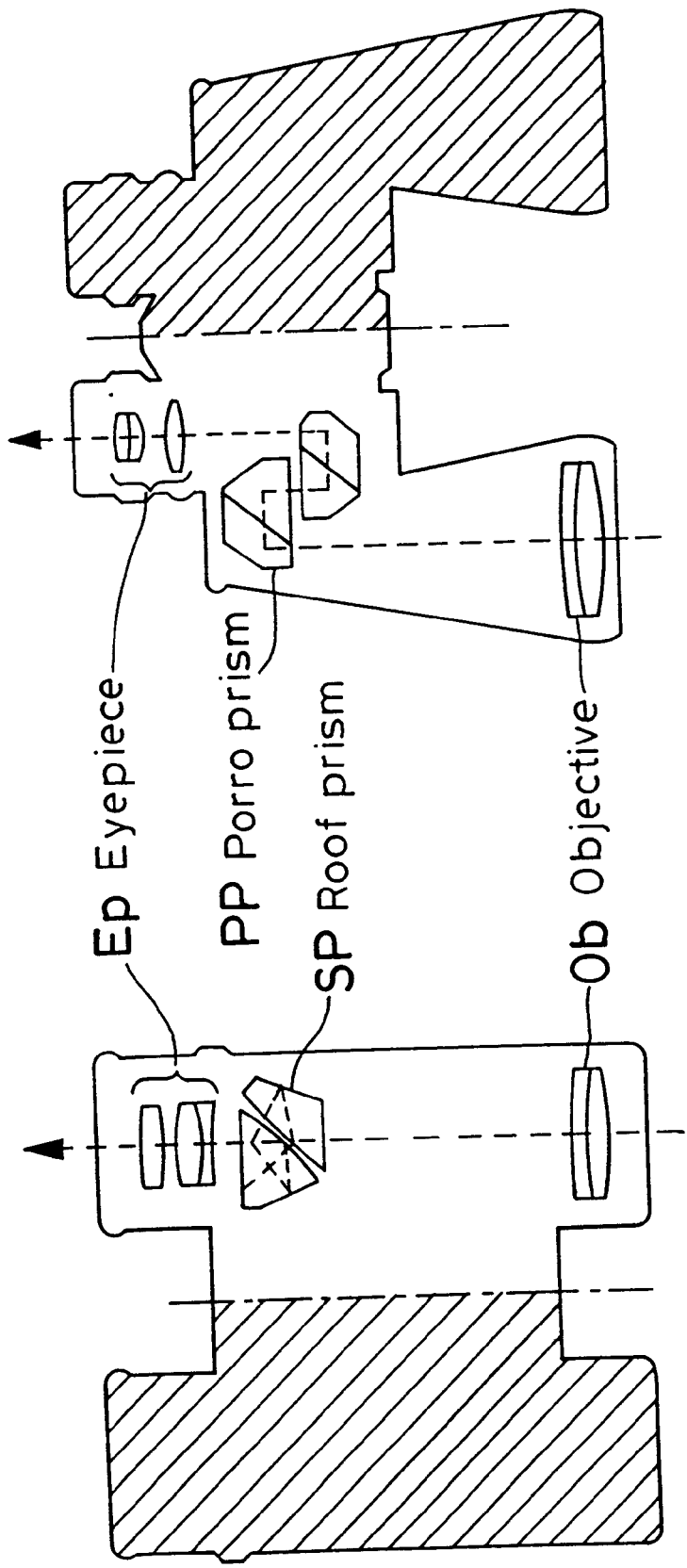

PRISM OPTICAL SYSTEM

This is a division of application Ser. No. 08/917,695, filed Aug. 26, 1997, now U.S. Pat. No. 6,008,948.

BACKGROUND OF THE INVENTION

1. Field of the Invention

The present invention relates generally to a prism optical system, and more specifically to a prism optical system having power, which comprises a decentered reflecting surface.

2. Background of Related Art

Among reflecting decentered optical systems of compact size known in the art, there is a one-dimensional light receiving lens system comprising a cylindrical reflecting surface as disclosed in JP-A-59-84201. However, this system can never take two-dimensional images. JP-A-62-144127 describes a system using an identical surface for two reflections, thereby reducing spherical aberration produced in the system described in JP-A-59-84201.

JP-A-62-205547 shows the use of an aspheric form of reflecting surface, but fails to refer exactly to the configuration of the reflecting surface. U.S. Pat. Nos. 3,810,221 and 3,836,931 disclose examples of a lens system comprising a rotationally symmetric aspheric mirror and a surface having only one symmetric plane, which is used for a finder optical system for reflex cameras. Note that the surface having only one symmetric plane is used for the purpose of correcting the tilt of the image to be observed.

JP-A-1-257834 (corresponding to U.S. Pat. No. 5,274,406) discloses an example of using a surface having only one symmetric plane for a reflector to make correction for image distortion in a rear projection type television, wherein a projection lens system is used for projection onto a screen, and the surface having only one symmetric plane is used for correcting image distortion.

JP-A-7-333551 discloses an example of a back-surface type of decentered optical system which comprises an anamorphic surface and a toric surface, and is designed as a viewing optical system. However, this system is still less than satisfactory in terms of correction of aberrations inclusive of image distortion, and so cannot be applied to a phototaking optical system.

However, none of these prior systems is a system having only one symmetric plane and using a back-surface mirror for a turn-back optical path.

Also, all these prior systems are directed to a sort of rotationally symmetric optical system wherein a refracting lens forming part of the optical system is constructed of a plane rotationally symmetric with respect to an optical axis.

One problem with such prior systems is that unless a formed real image is well corrected for aberrations and distortion, an image pattern or the like will be distorted, ending up with a failure in recording an exact form thereof. Another problem is that since the optical path is in a linear form, the optical system becomes long in the optical axis direction, resulting in an increase in phototaking device size.

SUMMARY OF THE INVENTION

In view of such problems associated with the prior art, it is an object of the present invention to provide a prism optical system which has an image-forming action, and can form a clear yet substantially undistorted image even at a wide field angle.

Another object of the present invention is to provide a prism optical system which can act as both an inverting prism and an ocular optical system, and can form a clear yet substantially undistorted image even at a wide field angle.

According to one aspect of the present invention, the aforesaid objects are achievable by the provision of a prism optical system comprising an aperture and having an action on erecting an image formed by an objective, characterized by comprising a reflecting surface for erecting said image, said reflecting surface being constructed of a curved surface having a power, and said curved surface being of an irrotationally symmetric surface shape having no rotationally symmetric axis both within and outside said curved surface so that decentering aberration produced by reflection of light at said curved surface can be corrected.

Preferably in this aspect, the irrotationally symmetric surface shape comprises only one symmetry plane, and a three-dimensional surface configuration defined by $$Z = C_2 + C_3 y + C_4 x + C_5 y^2 + C_6 yx + C_7 x^2 + C_8 y^3 + \qquad (a)$$
$$C_9 y^2 x + C_{10} yx^2 + C_{11} x^3 + C_{12} y^4 +$$
$$C_{13} y^3 x + C_{14} y^2 x^2 + C_{15} yx^3 + C_{16} x^4 + C_{17} y^5 +$$
$$C_{18} y^4 x + C_{19} y^3 x^2 + C_{20} y^2 x^3 + C_{21} yx^4 + C_{22} x^5 +$$
$$C_{23} y^6 + C_{24} y^5 x + C_{25} y^4 x^2 + C_{26} y^3 x^3 + C_{27} y^2 x^4 +$$
$$C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7 \ldots$$

where $C_m$ (m is an integer of 2 or more) is a coefficient.

According to the first aspect of the present invention, there is also provided a prism optical system comprising a reflecting surface for image inversion, characterized in that:

said reflecting surface is located in said prism optical system such that incident and exit optical paths for a beam or pencil of light differ to produce irrotationally symmetric decentering aberration, and at least one surface of said reflecting surface, another reflecting surface, and a transmitting surface is of an irrotationally symmetric shape that can make correction for said irrotationally symmetric decentering aberration.

Preferably in this case, the prism optical system comprises at least four reflecting surfaces, and at least two transmitting surfaces.

According to the first aspect of the present invention, there is further provided a prism optical system comprising an aperture and a roof prism constructed of a curved surface, characterized in that:

said curved surface comprises at least one surface of an irrotationally symmetric shape having no rotationally symmetric axis both within and outside said surface.

According to the first aspect of the present invention, there is still further provided a prism optical system comprising an aperture and a Porro prism constructed of a curved surface, characterized in that:

said curved surface comprises at least one surface of an irrotationally symmetric shape having no rotationally symmetric axis both within and outside said surface.

According to another aspect of the present invention, the aforesaid objects are achievable by the provision of a prism optical system for image inversion, characterized in that:

said inverting prism optical system comprises at least two prisms, at least one of which is constructed of a curved surface having at least two surfaces of a rotationally asymmetric shape, each having no rotationally symmetric axis both within and outside the surface, at least one of said at least two rotationally asymmetric surfaces acting as a reflecting surface having a reflecting action and said rotationally asymmetric shape making correction for rotationally asymmetric aberration produced due to decentering, and said inverting prism optical system has a finite focal length so as to act as an ocular optical system.

In this case, the prism optical system may be designed to have substantially the same optical path as a Schmidt prism, and may be designed such that one of the two prisms has a substantially intersecting optical path and comprises a roof surface, whereas the other prism has an optical path that does not intersect. Alternatively, the prism optical system may be designed such that a prism having a substantially intersecting optical path and comprising a roof surface is located on an objective side of said system, and a prism having an optical path that does not intersect is located on a viewer's pupil side of said system.

According to the second aspect of the present invention, there is also provided a prism optical system for image inversion, characterized in that:

said inverting prism optical system comprises at least two prisms, at least one of which is constructed of a curved surface having at least two surfaces of a rotationally asymmetric shape, each having no rotationally symmetric axis both within and outside the surface, at least one of said at least two rotationally asymmetric surfaces acting as a reflecting surface having a reflecting action and said rotationally asymmetric shape making correction for rotationally asymmetric aberration produced due to decentering, and said inverting prism optical system has a finite focal length so as to act as an ocular optical system, and has a diffusing surface located in the vicinity of a primary image-forming position therein.

In what follows, why the aforesaid arrangements are used in the present invention, and how they work will be explained.

With this method, however, good images of reduced aberrations cannot be obtained, because the positive powers of the incident and exit surfaces must be increased for F-number reductions, and so aberrations such as chromatic aberration, spherical aberration, and field curvature become worse.

According to the present invention, this problem can successfully be solved by the provision of a prism optical system having a reduced F-number and well corrected for aberrations, wherein a decentered reflecting surface is allowed to have powder, so that the overall power of the prism can be increased.

When the decentered surface is allowed to have power, however, decentering gives rise to aberrations that cannot be corrected by use of a conventional rotationally symmetric aspheric surface. Among aberrations produced due to decentering there are coma, astigmatism, image distortion, and field curvature. In some cases, these aberrations have so far been corrected by use of toric, anamorphic or other surfaces, with priority given to astigmatism produced due to decentering. Never until now have wide-field angle yet compact arrangements with fully corrected aberrations inclusive of image distortion been achieved.

Attempts to make good correction for these aberrations at the same time by use of toric, anamorphic, rotationally symmetric aspheric, and spherical surfaces have all been unsuccessful.

The present invention has a characteristic feature of making good correction for the aforesaid aberrations at the same time, using a three-dimensional surface that is symmetric with respect to a plane, which has no rotationally symmetric axis both within and outside said surface, and has only one symmetric plane.

It is understood that the term "three-dimensional surface" used herein is defined by the following polynomial:

$$Z = C_2 + \\ C_3 y + C_4 x + \\ C_5 y^2 + C_6 yx + C_7 x^2 + \\ C_8 y^3 + C_9 y^2 x + C_{10} yx^2 + C_{11} x^3 + \\ C_{12} y^4 + C_{13} y^3 x + C_{14} y^2 x^2 + C_{15} yx^3 + C_{16} x^4 + \\ C_{17} y^5 + C_{18} y^4 x + C_{19} y^3 x^2 + C_{20} y^2 x^3 + C_{21} yx^4 + C_{22} x^5 + \\ C_{23} y^6 + C_{24} y^5 x + C_{25} y^4 x^2 + C_{26} y^3 x^3 + C_{27} y^2 x^4 + C_{28} yx^5 + C_{29} x^6 + \\ C_{30} y^7 + C_{31} y^6 x + C_{32} y^5 x^2 + C_{33} y^4 x^3 + C_{34} y^3 x^4 + C_{35} y^2 x^5 + C_{36} yx^6 + C_{37} x^7$$

(a)

First of all, the prism optical system according to the first aspect of the present invention is explained.

Generally, a roof or Porro prism known as an inverting prism is made up of a plane reflector, and so has no power in any sense. In reference to a binocular or terrestrial telescope, for instance, an inverting prism is located between an objective and an eyepiece to erect an inverted image formed by the objective.

If, in this case, the inverting prism is allowed to have the action of the objective on image formation, it is then possible to achieve structural simplification because the objective is dispensed with. For instance, if the incident and exit surfaces of the prism are made up of spherical surfaces, it is then possible for the prism to have power.

where $C_m$ (m is an integer of 2 or more) is a coefficient.

Here let Y, Z, and X axes represent a decentering direction, an optical axis direction of light that leaves the center of an object point and travels toward the center of an aperture, and an axis that intersects at right angles with the Y and Z axes. Then, it is possible to arbitrarily determine a tilt of the Y direction at any position on the X axis by using such a three-dimensional surface as at least one reflecting surface having a reflecting action. This in turn makes it possible to make correction for image distortion produced at a decentered concave mirror, especially image distortion that changes with an image height in the X-axis direction, and is produced in the Y-axis direction. In short, it is consequently possible to make good correction for image distortion with a horizontal line seen in an arched form.

Then, an account is given of a trapezoidal form of distortion produced at a decentered concave mirror. To explain this image distortion with reference to back tracing from an viewer's eyeball, note that light rays leaving the eyeball diverge in the X-axis direction, and strike the decentered concave mirror at which the rays are reflected. However, the light rays to be reflected at the concave mirror diverge more in the X-axis direction because of a difference in the length of the optical paths for a light ray in a Y-axis positive direction of the concave mirror and for a light ray in a Y-axis negative direction of the concave mirror. For this reason, an image in the Y-axis positive direction and an image in the Y-axis negative direction are formed with varying sizes. Consequently, the image has a trapezoidal form of distortion, or coma produced due to decentering even on the axis becomes large.

By use of the three-dimensional surface it is possible to correct this distortion, and coma. This is because, as can be seen from the defining polynomial (a), the three-dimensional surface has odd-numbered terms for Y and even-numbered terms for X that enable curvature to be arbitrarily changed in the X-axis direction depending on whether the Y axis is in the positive or negative direction.

Reference is now to rotationally asymmetric field curvature produced at a decentered concave mirror. For instance, a light ray leaving an object point at infinity strikes the concave mirror at which the light ray is reflected. In this case, however, the distance between a light incident portion of the mirror and an image plane is half the curvature of the light incident portion. In other words, there is formed an image plane that tilts with respect to the direction of traveling of light upon being reflected at the decentered concave mirror. By use of the three-dimensional surface it is possible to arbitrarily determine the X-, and Y-axis direction curvatures of any point with respect to the positive, and negative directions of the Y axis. This is because, as can be seen from three-dimensional surface-defining polynomial (a), the three-dimensional surface has odd-numbered terms for Y that enable curvature to be arbitrarily changed depending on whether the Y axis is in the positive or negative direction. This is favorable for making correction for rotationally asymmetric field curvature, especially tilt of field produced at the decentered concave mirror.

Reference is then made to rotationally symmetric field curvature. Generally, a reflector gives rise to field curvature along a reflecting surface. The prism optical system according to the present invention may be corrected for field curvature by a convex mirror that forms a pair with the concave mirror mentioned above. However, this field curvature cannot be completely corrected due to a reduced number of surfaces. A portion of the field curvature that remains uncorrected is preferably corrected by a three-dimensional surface that can have any desired curvature at any desired place.

It is also possible to correct for astigmatism by properly changing the difference between the X-axis direction curvature and the Y-axis direction curvature.

With the productivity of optical parts in mind, it is more preferable to minimize the number of three-dimensional surfaces within a necessary range. If one surface of at least three surfaces is constructed of a three-dimensional surface and other surfaces are made up of planes, spherical surfaces or decentered rotationally symmetric planes, it is then possible to achieve high productivity.

In the present invention, the above-mentioned three dimensional surface is used for at least one reflecting surface having a reflecting action. In this case, the reflecting surface is preferably in a surface shape having no rotationally symmetric axis both within and outside said surface, and having only one symmetric plane. This is because if, in a coordinate system as typically shown in FIG. 9, a Y-Z plane that is a surface portion of a decentered surface which includes a normal direction thereof is formed of such a three-dimensional surface that becomes a symmetric plane, it is then possible to make an image on an image-forming surface in ray tracking symmetric on both sides of the symmetric Y-Z plane, thereby achieving considerable reductions in the labor needed for aberration correction.

The term "reflecting surface having a reflecting action" used herein is understood to include every reflecting surface having a reflecting surface, for instance, total reflecting surfaces, mirror coated surfaces, and semi-transmitting reflecting surfaces.

When, as mentioned above, a three-dimensional surface that has only one symmetric plane and is symmetric with respect to plane used for at least one surface of a prism optical system, it is preferable to satisfy the following conditions because the prism optical system has a wide field angle and is corrected for aberrations.

On condition that X, Y, and Z axes are determined according to the aforesaid definition, a light ray leaving the center of an object and striking an image-forming surface upon passing through the center of an aperture is defined as an axial chief ray. Then, the maxima and minima of a surface shape of an effective region of each reflecting surface in the X, and Y directions, respectively, are determined as shown in Table 1.

TABLE 1

|  | Zero field angle in the X direction | Max. field angle In the X direction |
| --- | --- | --- |
| Max. field angle in the Y positive direction | (1) |  |
| Zero field angle in the Y direction | (2) | (5) |
| Max. field angle in the Y negative direction | (3) |  |

As stated in Table 1, let (2) represent a portion which the axial chief ray strikes, (1) represent a maximum portion of an upper effective region, (5) represent a transversely maximum region, and (3) represent a maximum portion of a lower effective region. Then, let DY1, DY2, DY3 and DY5, and CY1, CY2, CY3 and CY5 represent tilts, and curvatures, respectively, of a Y-axis direction (corresponding to a decentering direction of each surface) of a condition giving a definition of the shape of the surface in the effective region, as found at these portions (1), (2), (3), and (5). Here note that the aforesaid condition is provided in a form that expresses the Z axis as an axis for the surface or in the form of Z=f(X, Y) with the proviso that the surface is not decentered at all. Also, let DX1, DX2, DX3 and DX5, and CX1, CX2, CX3 and CX5 represent tilts, and curvatures, respectively, of an X-axis direction perpendicular to the Y-axis direction.

Now consider a decentered surface with reference to an example of an inverting prism to which the present invention is applied, i.e., a Schmidt prism that is a sort of roof prism such as one schematically depicted in FIG. 9. This prism optical system, generally shown by 5, comprises a first prism 3 and a second prism 4 located in close vicinity. Here the center of an entrance aperture 1 is defined as the origin and an axis passing through that center is defined as an optical axis 2. Note that in Example 1 given later, on a first surface 31 of a first prism 3 there is located an aperture the center of which is defined as the origin; however, in Example 2 an apex position of a first surface 31 of a first prism 31 is defined as the origin because an aperture is positioned on a virtual surface between the first prism 3 and a second prism 4. Then, a direction that extends from the aperture 1 along the optical axis 2 is defined as a Z-axis direction, a direction within a surface, which is perpendicular and passes through the center of the aperture 1 and in which a light ray is turned back by the prism optical system 5, is defined as a Y-axis direction, a direction that is perpendicular to Z and Y axes and passes through the center of the aperture 1 is defined as an X-axis direction, a direction from the aperture 1 toward the prism optical system 5 is defined as a Z-axis positive direction, a direction from the optical axis 2 toward the second prism 4 is defined as a Y-axis positive direction, and a direction that forms a right-hand system with the Y axis is defined as an X-axis positive direction.

The first prism 3 in the prism optical system 5 comprises three surfaces, i.e., a transmitting or first surface 31, a second surface 32 acting as a combined reflecting and transmitting surface and a reflecting or third surface 33, and the second prism 4 comprises three surfaces, i.e., a first surface 41 acting as a combined transmitting and reflecting surface, a second surface 42 acting as a combined reflecting and transmitting surface and a third surface 43 consisting of a roof surface or four surfaces when the roof surface is counted as two surfaces). Upon leaving an object and striking the first surface 21 of the first prism 3, light is reflected at the second surface 32 and then at the third surface 33. The reflected light now transmits through the second surface 32 and leaves the first prism 3. The light subsequently goes into the second prism 4 through the first surface 41 of the second prism 4 in opposition to the second surface 32 of the first prism 3, and is reflected at the second surface 42 and then at the third surface 43. The reflected light is now reflected at the first surface 41 and, upon transmitting through the second surface 42, finally leaves the second prism 4 along the optical axis 2.

Here let the Y-axis direction be a vertical direction, and let CX2 represent a curvature of a portion of a surface which an axial chief ray leaving the center of an object in the Z-axis direction intersects, as found within the surface including an X axis of a condition giving a definition of the surface and corresponding to a direction perpendicular to a decentering direction of the surface and a normal of the surface and CY2 represent a curvature of a portion of the surface which the axial chief ray intersects, as found within the surface including the Y axis and a normal of the surface. Then, it is preferable for at least one surface in the prism optical system to satisfy condition (1-1):

$$CX2/CY2<0 \tag{1-1}$$

This is a condition necessary for reducing astigmatism produced at a decentered reflecting surface. In the case of a spherical surface, CX2/CY2=1. However, a decentered spherical surface produces considerable amounts of image distortion and other aberrations such as astigmatism and coma. Consequently, when the decentered surface is constructed of a spherical surface alone, it is difficult to make correction for astigmatism on the axis and so it is difficult to observe a clear image even at the center of a field of vision. To correct these aberrations, it is required that a reflecting surface that has the greatest catadioptric power in the prism optical system be constructed of a surface having only one symmetric plane, and that at least one surface conforming to condition (1-1) be located in the prism optical system. Thus, it is possible for the first time to observe an image free from astigmatism.

More preferably, it is important to use at least two reflecting surfaces conforming to condition (1-1).

Most preferably, it is important to use at least three reflecting surfaces conforming to condition (1-1).

It is also important that the first reflecting surface, which also acts as an exit surface, conform to condition (1-1). This is important for canceling field curvature aberration produced at the second reflecting surface of the first prism by field curvature aberration produced at the first reflecting surface of the second prism.

More preferably, it is important that a reflecting surface conforming to condition (1-1) be located in the first prism undergoing two reflections and that a reflecting surface conforming to condition (1-1) be located in the second prism undergoing at least three reflections. This is required for making good correction for astigmatism and image distortion with the first and second prisms.

Most preferably, the aforesaid two surfaces are located at the second surface of the first prism and at the first surface of the second prism. This is because the two surfaces are located in close vicinity and the angles of incidence of light rays thereon are substantially identical with each other, so that equivalent aberrations are produced.

Next, the power of the second reflecting surface of the first prism is explained. Here let FY1-2 and f represent the focal length of this surface in the Y-axis direction and the overall focal length of the optical system, respectively. In view of making correction for aberrations, it is then preferable to satisfy condition (2-1):

$$|FY1\text{-}2/f|<1 \tag{2-1}$$

When the upper limit of 1 in the aforesaid condition (2-1) is exceeded, the power of the second reflecting surface of the first prism becomes weak with an increase in the focal length thereof, and so the effect of that surface on making correction for field curvature becomes slender. In the present invention, field curvature having a convex shape at its center cannot be corrected.

More preferably, it is important that the power of the second reflecting surface of the first prism define a positive reflecting surface having a converging action in the Y-axis direction. By making the power of this surface in the Y-axis direction positive, it is possible to shorten the principal point separation in the prism optical system. This is important to design a compact image-forming optical system.

More preferably, it is important that the power of the second reflecting surface of the first prism define a negative reflecting surface having a diverging action in the X-axis direction. By making the power of this surface in the X-axis direction negative, it is possible to obtain satisfactory results in view of aberration correction.

Next, the power of the first reflecting surface of the second prism is explained. Here let FY2-1 and f represent the focal length of this surface in the Y-axis direction and the overall focal length of the optical system, respectively. For aberration correction, it is then preferable to satisfy condition (3-1):

$$|FY2\text{-}1/f|<1 \tag{3-1}$$

When the upper limit of 1 in condition (3-1) is exceeded, the power of the aforesaid surface becomes weak with an increase in the focal length thereof, and so the effect of that surface on making correction for field curvature becomes slender. In the present invention, field curvature having a convex shape at its center cannot be corrected.

More preferably, it is important that the power of the first reflecting surface of the second prism define a negative reflecting surface having a diverging action in the Y-axis direction. By making the power of this surface in the Y-axis direction negative, it is possible to shorten the principal point separation in the prism optical system. This is important to design a compact image-forming optical system.

More preferably, it is important that the power of the first reflecting surface of the second prism define a positive reflecting surface having a converging action in the X-axis direction. By making the power of this surface in the X-axis direction positive, it is possible to obtain satisfactory results in view of aberration correction.

Next, the power of the third reflecting surface of the second prism is explained. Here let FY2-3 and f represent the focal length of this surface in the Y-axis direction and the overall focal length of the optical system, respectively. In view of aberration correction, it is then preferable to satisfy condition (4-1):

$$|FY2\text{-}3/f|<1 \tag{4-1}$$

When the upper limit of 1 in condition (4-1) is exceeded, the power of the third reflecting surface of the second prism becomes weak with an increase in the focal length thereof, and so the effect of that surface on making correction for field curvature becomes slender. In the present invention, field curvature having a convex shape at its center cannot be corrected.

More preferably, it is important that the power of the third reflecting surface of the second prism define a positive reflecting surface having a converging action in the Y-axis direction. By making the power of this surface in the Y-axis direction positive, it is possible to shorten the principal point separation in the prism optical system. This is important to design a compact image-forming optical system.

More preferably, it is important that the power of the third reflecting surface of the second prism defines a negative reflecting surface having converging action in the X-axis direction. By making the power of this surface in the X-axis direction negative, it is possible to obtain satisfactory results in view of aberration correction.

Reference is then made to what power is allocated to each surface. Here let CX1-1, CX1-2, CX2-1 and CX2-3, and CY1-1, CY1-2, CY2-1 and CY2-3 represent the powers of the first and second reflecting surfaces of the first prism, and the powers of the first and third reflecting surfaces of the second prism in the X, and Y directions, respectively. In the present invention, it is important that any desired three reflecting surfaces out of the four reflecting surfaces have power in positive-negative-positive order. This condition is favorable for making correction for field curvature and coma, as in the case of a general triplet type of rotationally symmetric optical system, so that good aberration correction is achievable.

More preferably, the X-direction curvature is given to the reflecting surfaces CX1-1, CX1-2, and CX2-1, while the Y-direction curvature is given to the reflecting surfaces CY1-2, CY2-1, and CY2-3.

Reference is then made to what condition is required to minimize asymmetric image distortion produced by decentering. By satisfying the following condition it is possible to reduce the distortion of an image formed with an arched horizontal line, and coma produced even on the axis. Here let DY2 and DY5 represent tilts of at least one reflecting surface in the Y-axis direction corresponding to a decentering direction of a surface in the surface shape-defining condition, as found at the portion (2) which the axial chief ray strikes and the right-hand portion (5) of the effective region, and let a Z-axis be defined as being such that a light ray is incident from a Z-axis negative direction in the surface shape-defining condition and reflected in the Z-axis negative direction. In view of correction for aberrations, it is then preferable to satisfy either one of conditions (5-1) and (5-2):

$$0<DY1\text{-}1 \text{ mm} \tag{5-1}$$

$$DY1\text{-}2>0 \text{ mm} \tag{5-2}$$

where DY1-1 represents a difference between DY5 and DY2 of the first reflecting surface of the first prism, and DY1-2 represents a difference between DY5 and DY2 of the second reflecting surface of the first prism.

When the lower limit of 0 in condition (5-1), and the lower limit of 0 in condition (5-2) is not reached, the Y-direction tilt of the right-hand center portion within the effective region becomes improper, resulting in under-correction of an arched form of field curvature and axial coma.

In view of correction for aberrations, it is more preferable to satisfy either one of the following conditions:

$$0.001<DY1\text{-}1 \text{ mm} \tag{5-3}$$

$$DY1\text{-}2>0.001 \text{ mm} \tag{5-4}$$

Most preferably, the conditions mentioned above are all satisfied.

In view of correction for aberrations, it is also preferable to satisfy condition (6-1):

$$0.5<|FY1\text{-}2/FY2\text{-}1|<10 \tag{6-1}$$

where FY1-2, and FY2-1 represent the focal lengths of the second reflecting surface of the first prism, and the first reflecting surface of the second prism, respectively, with respect to the Y-axis.

Departures from the upper limit of 10 and the lower limit of 0.5 in condition (6-1) are not preferable because a wide yet flat image cannot be formed all over the image plane. The reason is that the powers allocated to two reflecting surfaces, which have relatively strong catadioptric powers in the image-forming optical system and are located in close vicinity, become improper.

More preferably, it is important to satisfy condition (6-2):

$$0.8<|FY1\text{-}2/FY2\text{-}1|<5 \tag{6-2}$$

Most preferably, it is important to satisfy condition (6-3):

$$1<|FY1\text{-}2/FY2\text{-}1|<2 \tag{6-3}$$

The aforesaid conditions (6-2), and (6-3) are necessary to obtain good images with optical systems having an F-number of up to 10, and up to 5, respectively.

It is then important that the conditions mentioned below are satisfied by a surface that has a particularly strong catadioptric power in the prism optical system. These are important to make well-balanced correction for all aberrations produced at a decentered surface comprising only one symmetric plane and, at the same time, to minimize the tilt of the image plane. The conditions are especially important for an optical system using two decentered concave mirrors such as one contemplated in the present invention.

For correction for aberrations according to the present invention, it is thus preferable that any one of the following conditions is satisfied:

$$0<CX3\text{-}1(1\text{-}1)<0.01(1/mm) \tag{7-1}$$

$$-0.01 < CX3\text{-}1(1\text{-}2) < 0 (1/\text{mm}) \tag{7-2}$$

$$0 < CX3\text{-}1(2\text{-}1) < 0.01 (1/\text{mm}) \tag{7-3}$$

It is here noted that, supposing that CX3–CX1 is a difference between X-direction curvatures CX1 and CX3 of upper and lower effective region portions (1) and (3) where an axial chief ray is reflected at at least one reflecting surface in the optical system, CX3-1(1-1) represents CX3–CX1 in the first reflecting surface of the first prism, CX3-1(1-2) represents CX3–CX1 in the second reflecting surface of the first prism, and CX3-1(2-1) represents CX3–CX1 in the first reflecting surface of the second prism.

Departures from the upper and lower limits in conditions (7-1) to (7-3), given above, cause the X-direction curvature of a surface portion within the effective region to become too large, resulting in over-correction of higher order comae throughout the optical system. If such differences are zero, on the contrary, it is then impossible to make correction for higher order comae when they are produced.

More preferably, it is important that both the aforesaid at least two reflecting surfaces satisfy the aforesaid conditions.

Most preferably, it is important that all the aforesaid three reflecting surfaces satisfy the aforesaid conditions.

It is then important that the conditions mentioned below are satisfied by a surface that has a particularly strong catadioptric power in the prism optical system. These are important to make well-balanced correction for all aberrations produced at a decentered surface comprising only one symmetric plane and, at the same time, to minimize the tilt of the image plane. The conditions are especially important for an optical system using two decentered concave mirrors such as one contemplated in the present invention.

For correction for aberrations according to the present invention, it is thus preferable that any one of the following conditions is satisfied:

$$0 < CY3\text{-}1(1\text{-}2) < 0.01 (1/\text{mm}) \tag{8-1}$$

$$-0.01 < CY3\text{-}1(1\text{-}1) < 0 (1/\text{mm}) \tag{8-2}$$

$$0 < CY3\text{-}1(2\text{-}2) < 0.01 (1/\text{mm}) \tag{8-3}$$

It is here noted that, supposing that CY3–CY1 is a difference between Y-direction curvatures CY1 and CY3 of upper and lower effective region portions (1) and (3) where an axial chief ray is reflected at at least one reflecting surface in the optical system, CY3-1(1-2) represents CY3–CY1 in the second reflecting surface of the first prism, CY3-1(2-1) represents CY3–CY1 in the first reflecting surface of the second prism, and CY3-1(2-2) represents CY3–CY1 in the second reflecting surface of the second prism.

Departures from the upper and lower limits in conditions (8-1) to (8-3), given above, cause the Y-direction curvature of a surface portion within the effective region to become too large, resulting in over-correction of higher order comae throughout the optical system. If such differences are zero, on the contrary, it is then impossible to make correction for higher order comae when they are produced.

More preferably, it is important that both the aforesaid at least two reflecting surfaces satisfy the aforesaid conditions.

Most preferably, it is important that all the aforesaid three reflecting surfaces satisfy the aforesaid conditions.

It is understood that conditions (1-1) to (8-3), mentioned above, may also be applied to an embodiment wherein any one of reflecting surfaces forming an image-forming optical system is constructed of not only a three-dimensional surface that is symmetric with respect to plane, which has no rotationally symmetric axis both within and outside the surface yet has only one symmetric plane, but also an anamorphic surface having no rotationally symmetric axis both within and outside the surface, i.e., an embodiment wherein any one of those reflecting surfaces is constructed of an irrotationally symmetric surface having no rotationally symmetric axis both within and outside the surface.

In the aforesaid Schmidt prism that is a sort of roof prism, it is possible to obtain an inverted image by allowing the second reflecting surface of the second prism to have a roof surface. In other words, the prism optical system of the present invention enables an inverted image to be obtained with no need of locating an image-forming lens within the optical system.

Now consider a decentered surface with reference to a Porro prism schematically shown in FIG. 10, which is an alternative example of the inverting prism to which the present invention is applied. This prism optical system, shown generally by 5, comprises first and second prisms 3 and 4 located in close vicinity. Separate coordinate systems are determined for the first and second prisms 3 and 4. In the coordinate system for the first prism 3, the center of an entrance aperture 1 is defined as the origin. (In Examples 3 and 4 given later, wherein an aperture is located on a first surface 41 of a second prism 4, the origin is defined by an apex position of a first surface 31 of a first prism 3.) Supposing an axis passing through that center to define an optical axis 2, a Z-axis direction is given by a direction extending from the aperture 1 along the optical axis 2; a Y-axis direction given by a direction within a surface that is perpendicular to the Z-axis and passes through the center of the aperture 1, wherein light is turned back by the first prism 3; and an X-axis direction given by a direction that is perpendicular to the Z- and Y-axes and passes through the center of the aperture 1. Then, a direction from the aperture 1 toward the first prism 3 defines a positive direction for the Z-axis while a direction from the optical axis 2 toward the second prism 4 defines a positive direction for the Y-axis, and a direction that forms a right-hand system with respect to the Z- and Y-axes defines a positive direction for the X-axis. By definition, the coordinate system for the second prism 4 is the coordinate system for the first prism 3 upon being rotated through 90° around the Z axis in the counterclockwise direction. Note that in Examples 3 and 4 given later, the origin of the coordinate system for the second prism 4 is the same as that for the first prism 3.

In the prism optical system 5, the first prism 3 comprises a transmitting or first surface 31, a reflecting or second surface 32, a reflecting or third surface 33, and a transmitting or fourth surface 34, four surfaces in all. The second prism 4, too, comprises a transmitting or first surface 41, a reflecting or second surface 42, a reflecting or third surface 43, and a transmitting or fourth surface 44, four surfaces in all. Light, leaving an object and striking the first surface 31 of the first prism 3 through the aperture 1, is reflected at the second and third surfaces 32 and 33, and leaves the first prism 3 upon being transmitted through the fourth surface 34. Then, the transmitted light is incident on the second prism 4 from the first surface 41 thereof opposite to that fourth surface 34, reflected at the second and third surfaces 42 and 43, and finally leaves the fourth surface 44 upon being transmitted therethrough.

When, in this case, the aperture is located on an object side of the prism optical system, it is required to diminish the power of the transmitting surfaces in order to minimize chromatic aberration of magnification. In other words, it is important to satisfy condition (9-1):

$$|2 \times F_{tmin}| > |F_{rmin}| \text{mm} \tag{9-1}$$

where $F_{tmin}$ is a minimum focal length for the transmitting surfaces in the prism optical system, and $F_{rmin}$ is a minimum focal length for the reflecting surfaces in the prism optical system.

More preferably, it is important to satisfy condition (9-2):

$$|1.5 \times F_{tmin}| > |F_{rmin}| \text{mm} \tag{9-2}$$

Most preferably, it is important to satisfy condition (9-3):

$$|1.2 \times F_{tmin}| > |F_{rmin}| \text{mm} \tag{9-3}$$

Unless any one of the above conditions is satisfied, the powers of the transmitting surfaces become too strong, and too large chromatic aberration of magnification is produced. This renders the resolution of edges of the image worse and, at the same time, produces an unacceptable quantity of axial chromatic aberration.

Now suppose the Y-axis direction defines a decentering direction of the prism, and let CX2 represent a curvature of a portion of a surface which an axial chief ray leaving the center of an object in the Z-axis direction intersects, as found within the surface including an X axis of a condition giving a definition of the surface and corresponding to a direction perpendicular to a decentering direction of the surface and a normal of the surface and CY2 represent a curvature of a portion of the surface which the axial chief ray intersects, as found within the surface including the Y axis and a normal of the surface. Then, it is preferable for at least one surface in the prism optical system to satisfy condition (10-1):

$$1 < CX2/CY2 \tag{10-1}$$

where CX2/CY2 is a ratio of CX2 to CY2.

This condition is required to minimize astigmatism produced at the decentered surface. For a spherical surface, CX2/CY2=1. In the case of a decentered spherical surface, however, considerable amounts of image distortion, and other aberrations such as astigmatism and coma are produced. When the decentered surface is constructed of a spherical surface alone, it is thus difficult to make correction for the astigmatism on the optical axis and, hence, to observe a clear image even at the center of a field of view. To eliminate these disadvantages, it is required that the reflecting surface having the greatest catadioptric power in the optical system be constructed of a surface having only one symmetric surface, and there be located at least one reflecting surface capable of satisfying condition (10-1). Without such an arrangement, it is impossible to observe even on the optical axis an image free from astigmatism.

For making correction for aberrations according to the present invention, it is more preferable to satisfy condition (10-2):

$$1.2 < CX2/CY2 \tag{10-2}$$

Most preferably, it is important that the reflecting surface conforming to the above condition be constructed of at least two reflecting surfaces.

When the first prism is located on the object side and the second prism is on the image side, it is more preferable to make correction for aberrations by locating two reflecting surfaces conforming to the above condition on the first and second reflecting surfaces of the second prism.

Again suppose the Y-axis direction defines a decentering direction of the prism, and let CX2 represent a curvature of a portion of a surface which an axial chief ray leaving the center of an object in the Z-axis direction intersects, as found within the surface including an x axis of a condition giving a definition of the surface and corresponding to a direction perpendicular to a decentering direction of the surface and a normal of the surface, and CY2 represent a curvature of a portion of the surface which the axial chief ray intersects, as found within the surface including the Y axis and a normal of the surface. Then, it is preferable for at least one surface in the prism optical system to satisfy condition (11-1):

$$CX2/CY2 < 1 \tag{11-1}$$

where CX2/CY2 is a ratio of CX2 to CY2.

As in the case of the above condition (10-1), this condition is required to minimize astigmatism produced at a decentered reflecting surface. To correct the astigmatism according to the present invention, it is important that a surface in the optical system be constructed of a surface having only one symmetric plane, and that at least one surface conforming to condition (11-1) be located in the optical system to cooperate with the surface conforming to condition (10-1), thereby making correction for aberrations.

More preferably, it is desired to satisfy condition (11-2):

$$CX2/CY2 < 0.8 \tag{11-1}$$

More preferably, it is important that the surface conforming to the above conditions be constructed of a transmitting surface so as to shorten the distance between that surface and the reflecting surface and so reduce higher order aberrations.

When the second prism is located on the image side, it is more preferred in view of aberration correction that two reflecting surfaces conforming to condition (10-1) be used for the first and second reflecting surfaces of the second prism and a transmitting surface conforming to condition (11-1) be used for the first transmitting surface of the second prism.

Reference is made to an embodiment of the present invention wherein an aperture is located substantially midway between the aforesaid two prisms. With the aperture located midway between the prisms, it is possible to increase the power of the transmitting surface of each prism because the amount of chromatic aberration of magnification produced can structurally be reduced. This, in turn, makes it possible to achieve a positive-negative-positive surface design generally called a triplet, so that the back focal length can be shortened. In other words, it is important for aberration correction that positive-negative-positive surface layouts be introduced irrespective of the X and Y directions.

In the X direction, on the one hand, it is more preferred that a positive-negative-positive surface layout be constructed of the first transmitting surface of the first prism, the first transmitting surface of the second prism, and the first or second reflecting surface or second transmitting surface of the second prism.

In the Y direction, on the other hand, it is more preferred that a positive-negative-positive surface layout be constructed of the first reflecting surface of the second prism, the second reflecting surface of the second prism, and the second transmitting surface of the second prism.

For a surface having a particularly strong catadioptric power in the prism optical system, it is important to satisfy the following condition. This is a condition important to make well-balanced correction for all aberrations produced at the decentered surface having only one symmetric plane and make the tilt of a phototaking surface small. This condition is particularly important for an optical system using two decentered concave mirrors such as one contemplated in the present invention.

Specifically, it is important for aberration correction that the optical system be provided therein with at least one reflecting surface that satisfies condition (12-1):

$$-0.1 < CX3\text{-}1 < 0 \text{ mm} \quad (12\text{-}1)$$

where CX3-1 is a difference in X-direction curvature CX1 and CX3 between upper and lower effective region portions (1) and (3) of at least one reflecting surface in the optical system, at which an axial chief ray is reflected.

Departures from the upper and lower limits of condition (12-1) cause the X-direction curvatures of the surface portions within the effective regions to become too largely different from each other, resulting in over-correction of higher order comae throughout the optical system. When this difference is zero, on the contrary, it is impossible to make correction for higher order comae.

More preferably, it is important that at least two reflecting surfaces satisfy condition (12-1) mentioned above.

More preferably, at least two surfaces conforming to condition (12-1) are used for the first and second reflecting surfaces of the second prism.

Most preferably, it is important to satisfy condition (12-1) as well as the following condition (12-2):

$$0 < CX3\text{-}1(2\text{-}t1) < 0.1 \quad (12\text{-}2)$$

where CX3-1(2-t1) is CX3-1 for the first transmitting surface of the second prism. With this design it impossible to make effective correction of coma in particular.

For the surface having a particularly strong catadioptric power in the prism optical system, it is important to satisfy the following condition (13-1). As is the case with conditions (12-1) and (12-2) mentioned above, this is a condition that is important to make well-balanced correction for all aberrations produced at the decentered surface having only one symmetric plane and to make the tilt of the image plane small. This condition is particularly important for an optical system using two decentered concave mirrors such as one contemplated in the present invention.

Specifically, it is important for aberration correction that the optical system be provided therein with at least one reflecting surface that satisfies condition (13-1):

$$-0.1 < CY3\text{-}1 < 0 \quad (13\text{-}1)$$

where CY3-1 is a difference in Y-direction curvature CY1 and CY3 between upper and lower effective region portions (1) and (3) of at least one reflecting surface in the optical system, at which an axial chief ray is reflected.

Departures from the upper and lower limits of condition (13-1) cause the Y-direction curvatures of the surface portions within the effective regions to become too largely different from each other, resulting in over-correction of higher order comae throughout the optical system. When this difference is zero, on the contrary, it is impossible to make correction for higher order comae.

More preferably, it is important that at least two reflecting surfaces satisfy condition (13-1) mentioned above.

Most preferably, at least two surfaces conforming to condition (13-1) are used for the first and second reflecting surfaces of the second prism.

Also, it is preferred that the first transmitting surface of the second prism, too, satisfy condition (13-1). With this design it is possible to make effective correction for coma in particular, when it is produced.

In reference here to a Porro prism system, it is noted that if two prisms have the same shape, a reduced number of common parts can then be used to construct that system.

In the practice of the present invention, it is preferable to satisfy any one of conditions (1-1) to (13-1) mentioned above, although a more desirable prism optical system can be obtained by a combination of two or more conditions. For a roof prism system, priority is given to conditions (1-1), (5-1), (7-1) and (8-1) in the described order, and for a Porro prism system, priority is given to (9-1), (12-1) and (13-1) in the described order.

In what follows, the second aspect of the present invention will be described.

According to this aspect, it is possible to give power to a decentered prism optical system by constructing a reflecting surface with a rotationally asymmetric surface. If, in this case, the action of an ocular optical system is added to an inverting prism optical system constructed of two prisms, structural simplification can then be achieved because of no need of locating a separate ocular optical system apart from an inverting prism. This, in turn, makes it possible to construct compact binoculars, terrestrial telescopes, finder optical systems for cameras, etc.

It is also possible to construct the aforesaid rotationally asymmetric surface with a three-dimensional surface that has only one symmetric plane and is symmetric with respect to a plane or with an asymmetric polynominal surface (APS) having no symmetric plane. The latter case is characterized in that the surface is decentered three-dimensionally, not one-dimensionally.

Here the three-dimentional surface that is symmetric with respect to a plane, and an APS can be defined as follows:

$$Z = C_2 + \quad \text{(a)}$$
$$C_3 y + C_4 x +$$
$$C_5 y^2 + C_6 yx + C_7 x^2 +$$
$$C_8 y^3 + C_9 y^2 x + C_{10} yx^2 + C_{11} x^3 +$$
$$C_{12} y^4 + C_{13} y^3 x + C_{14} y^2 x^2 + C_{15} yx^3 + C_{16} x^4 +$$
$$C_{17} y^5 + C_{18} y^4 x + C_{19} y^3 x^2 + C_{20} y^2 x^3 + C_{21} yx^4 + C_{22} x^5 +$$
$$C_{23} y^6 + C_{24} y^5 x + C_{25} y^4 x^2 + C_{26} y^3 x^3 + C_{27} y^2 x^4 + C_{28} yx^5 + C_{29} x^6 +$$
$$C_{30} y^7 + C_{31} y^6 x + C_{32} y^5 x^2 + C_{33} y^4 x^3 + C_{34} y^3 x^4 + C_{35} y^2 x^5 + C_{36} yx^6 + C_{37} x^7$$

where $C_m$ (m is an integer of 2 or more) is a coefficient.

In a three-dimensional surface defined by polynomial (a), both X-Z and Y-Z surfaces are generally free of a symmetric plane (APS). By permitting all odd-numbered terms for x to be zero, however, there is obtained a three-dimensional surface that is symmetric with respect to a plane, wherein only one symmetric plane parallel to the Y-Z surface exists. With reference to polynomial (a), for instance, this is achievable by permitting coefficients for terms $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, etc. to be down to zero.

By reducing all odd-numbered terms for y to zero it is also possible to obtain a three-dimensional surface that is symmetric with respect to a plane, wherein only one symmetric plane parallel with the X-Z surface exists. Referring to polynomial (a), for instance, this is achievable by permitting coefficients for terms $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, etc. to go to zero. Such symmetric planes as mentioned above render productivity high.

By using either one of the symmetric planes parallel with the Y-Z and X-Z surfaces it is possible to make effective correction for rotationally asymmetric aberrations produced due to decentering.

By constructing a prism optical system having such an inverting prism as mentioned above and an action of an ocular optical system such that it has an optical path substantially similar to that in a Schmidt prism, it is possible to make an axial chief ray incident on a decentered prism optical system substantially parallel with the axial chief ray leaving the decentered prism optical system. This, in turn, makes it possible to construct a reasonable viewing optical system where the direction of directly viewing an object is in coincidence with the direction of viewing the object through the system.

In this case, one of the two prisms is constructed such that an optical path intersects and has a roof surface as in the case of a Schmidt prism, while another is constructed such that an optical path does not intersect.

In the prism optical system of the present invention which is constructed such that it has an optical path substantially similar to that in a Schmidt prism and which also functions as an ocular optical system, the prism having an intersecting optical path and a roof surface is located on an objective side of the system so that a primary image produced by an objective optical system through this prism is formed between the two prisms, and the prism having an optical path that does not intersect is located on a viewer's pupil side of the system so that the focal length of the prism optical system can be shortened. It is thus possible to construct an ocular optical system of high viewing magnification.

It is also possible to locate a field stop between the two prisms rather than in the prisms, thereby achieving structural simplification and high productivity.

More preferably, aberrations that cannot sufficiently be corrected by the prism located on the side of the viewer's pupil, especially a cylindrical form of field curvature, and coma are previously corrected by the prism having a substantially intersecting optical path, which is located on the objective side. It is thus possible to obtain satisfactory results in view of aberration correction.

By positioning a diffusing surface in the vicinity of a primary image-forming position located within the inverting prism which also functions as an ocular optical system, it is possible to increase the diameter of an exit pupil of the prism optical system of the present invention which also functions as an ocular optical system, because light is diffused at the diffusing surface irrespective of the diameter of an entrance pupil of an objective optical system. It is thus possible to construct an easy-to-view ocular optical system which is free from shading even when the viewer's pupil is slightly displaced.

By forming a primary image produced by an objective optical system between the two prisms, it is also possible to position a field stop in the vicinity of the primary image. It is thus possible to observe flare-free yet clear images.

It is more preferable to satisfy the following numerical values so that satisfactory results are achievable in view of aberration correction.

With reference first to a coordinate system, suppose that an axial chief ray is defined by a light ray leaving the center of an object and reaching the center of an exit pupil upon passing through the center of a stop, a Y-axis direction by a direction within a decentered surface portion of a surface, an X-axis direction by a direction perpendicular to the Y-axis direction, and a Z axis by an axis that forms an orthogonal coordinate system with the X and Y axes.

Also suppose that a light ray travels from the prism having a substantially intersecting optical path and a roof surface toward the prism having an optical path that does not intersect is defined as an axial chief ray. Reflecting surfaces of the prism optical system of the present invention except the roof surface are then designated 1, 2, 3 and 4 in the order of incidence of the light ray.

Also suppose that an axial chief ray is defined by a light ray leaving the center of an object and reaching the center of an exit pupil upon passing through the center of a stop, and let Pxn and Pyn represent X- and Y-direction powers of each reflecting surface at a position where the aforesaid axial chief ray strikes the reflecting surface. The letter n used herein represents the order of incidence of the axial chief ray on the reflecting surfaces or 1, 2, 3 and 4. In the present invention, the reflecting surfaces of positive powers are supposed to have positive values for Px, and Py.

According to the present invention, it is then important to satisfy condition (1):

$$-0.2 < Px3 < 0.2 \tag{1}$$

where Px3 is an X-direction power of a reflecting surface in the prism having an optical path that does not intersect, said surface being free of any transmitting action.

This condition gives a definition of the power of the decentered third reflecting surface. Below the lower limit of −0.2, the power of the third reflecting surface becomes weak. In other words, the power of the third reflecting surface—which is decentered at a relatively small angle, and so is unlikely to produce large decentering aberration—becomes too weak to construct an ocular optical system having a short focal length and high magnification. As the upper limit of 0.2 is exceeded, on the other hand, the power of the third reflecting surface becomes too strong, and so produces decentering aberration that is too large to be corrected by other surfaces.

For the Y-direction power, too, it is important to satisfy the following condition (2):

$$-0.2 < Py3 < 0.2 \tag{2}$$

where Py3 is a Y-direction power of the reflecting surface mentioned above.

The reasons mentioned in connection with the upper and lower limits of condition (1) also hold for condition (2).

It is more preferable to satisfy $$-0.1 < Px3 < 0.1 \tag{3}$$

$$-0.1 < Py3 < 0.1 \tag{4}$$

It is most preferably to satisfy $$-0.04 < Px3 < 0.08 \tag{5}$$

$$-0.01 < Py3 < 0.06 \tag{6}$$

This is best suited for constructing an ocular optical system having a large eye point.

In Example 4 according to the present invention, given later, wherein a primary image-forming action is imparted to an inverting prism optical system from which an objective optical system is omitted, it is important to satisfy conditions (7) and (8):

$$0 < Px3 < 0.08 \tag{7}$$

$$0 < Py3 < 0.06 \tag{8}$$

The meanings for the upper limits of 0.08 and 0.06, respectively, in conditions (7) and (8) are the same as those in conditions (5) and (6). The lower limits of 0 in both conditions (7) and (8) are a requirement to construct an ocular optical system with only a prism having an optical path that does not intersect. When the lower limits of 0 are not reached, it is impossible to give the power needed for an ocular optical system to the prism optical system having an optical path that does not intersect, because the power of the fourth reflecting surface is too much larger than that of the third reflecting surface. In addition, the decentering of the fourth reflecting surface having a relatively large tilt with respect to the axial chief ray produces rotationally asymmetric aberrations that are too large to be corrected by other surfaces.

The fourth reflecting surface is now explained. It is preferable to construct the fourth reflecting surface with a surface having a transmitting action because it is possible to construct a compact prism having an optical path that does not intersect. It is more preferable to construct the fourth reflecting surface in the form of a total reflecting surface because it is possible to construct a region having a transmitting action and a region having a reflecting action in an overlapping manner. This is particularly preferable to construct a compact prism optical system.

Satisfactory results in view of aberration correction are obtainable by satisfying conditions (9) and (10):

$$-0.2 < Px4 < 0.2 \tag{9}$$

$$-0.2 < Py4 < 0.2 \tag{10}$$

The reasons for the upper and lower limits of 0.2 and –0.2 in both conditions are the same as those in condition (1).

It is more preferable to satisfy conditions (11) and (12):

$$-0.1 < Px4 < 0.1 \tag{11}$$

$$-0.1 < Py4 < 0.1 \tag{12}$$

It is most preferable to satisfy conditions (13) and (14):

$$-0.1 < Px4 < 0.1 \tag{13}$$

$$0 < Py4 < 0.06 \tag{14}$$

In Example 4 according to the present invention, given later, wherein a primary image-forming action is imparted to an inverting prism optical system from which an objective optical system is omitted, it is important to satisfy conditions (15) and (16):

$$-0.1 < Px4 < 0 \tag{15}$$

$$0 < Py4 < 0.06 \tag{16}$$

Condition (16) is exactly the same as condition (14), but the upper limit of condition (15) is required to make correction for not only image plane aberration but also pupil aberration. When the upper limit of 0 in condition (15) is exceeded, the pupil aberrations of that prism and hence the inverting prism optical system become large, resulting in a large change in the shape of the exit pupil. Even if, for instance, the pupil of a viewer is located at the exit pupil position, it is then impossible to observe an image due to the shading of light rays.

Here suppose that a Y-axis direction is defined by a direction within a decentered surface portion of a surface, an X-axis direction by a direction perpendicular to the Y-axis direction, and a Z axis by an axis that forms an orthogonal coordinate system with the X and Y axes, and let Cxn represent an X-direction curvature difference between portions of each of decentered surfaces of the aforesaid reflecting surfaces 1 to 4, which a Y-positive direction chief ray having a maximum field angle within each decentered surface (Y-Z surface) and a Y-negative direction chief ray having a maximum field angle strike. It is then important to satisfy condition (17):

$$-0.1 < CX3 < 0.2 \tag{17}$$

This condition is to make correction for a trapezoidal form of image distortion when it is produced. When the lower limit of –0.1 in condition (17) is not reached, there is produced a trapezoidal form of distortion having a short lower side. When the upper limit of 0.2 is exceeded, on the other hand, there is produced a trapezoidal form of distortion having a short upper side.

More preferably, it is important to satisfy condition (18):

$$-0.02 < CX3 < 0.1 \tag{18}$$

For the fourth reflecting surface, too, it is important to satisfy condition (19):

$$-0.1 < CX4 < 0.1 \tag{19}$$

This condition is concerned with image distortion produced in a trapezoidal form. When the lower limit of –0.1 in condition (19) is not reached, there is produced a trapezoidal form of distortion having a short lower side. When the upper limit of 0.1 is exceeded, on the other hand, there is produced a trapezoidal form of distortion having a short upper side.

More preferably, it is important to satisfy condition (20):

$$-0.03 < Cx4 < 0.05 \tag{20}$$

Here, suppose that an axial chief ray is defined by a light ray leaving the center of an object and reaching the center of an exit pupil upon passing through the center of a stop, a Y-axis direction by a direction within a decentered surface portion of a surface, an X-axis direction by a direction perpendicular to the Y-axis direction, and a Z axis by an axis that forms an orthogonal coordinate system with the X and Y axes, and let DYn represent a difference between a value for tangent of the normal of the decentered surface within a Y-Z surface as found at a position of the reflecting surface which an X-direction axial chief ray having a maximum field angle strikes and a value for tangent of the normal of the decentered surface within the Y-Z surface as found at a position of the reflecting surface which an axial chief ray strikes. The letter n has the same meanings as mentioned above. It is then important to satisfy condition (21):

$$-0.1 < DY3 < 0.1 \tag{21}$$

This condition is to reduce image distortion produced in a mountain or valley form. As depicted in a perspective view of FIG. 19(a) and a projection view of FIG. 19(b), DYn represents a difference between a value for tangent of a normal n' of a rotationally asymmetric surface A within a Y-Z surface as found at a point where an X-direction chief ray having a maximum field angle intersects the rotationally asymmetric surface A and a value for tangent of a normal n of the rotationally asymmetric surface A within the Y-Z surface as found at a point where an axial chief ray intersects the rotationally asymmetric surface A. It is then important that the third reflecting surface satisfy condition (21). When the lower limit of −0.1 in condition (21) is not reached, there is produced a mountain form of image distortion. When the upper limit of 0.1 is exceeded, on the other hand, there is produced a valley form of image distortion. It is thus difficult to make well-balanced correction for these image distortions together with other aberrations by other surfaces.

More preferably, it is important to satisfy condition (22):

$$-0.05<DY3<0.01 \tag{22}$$

For the fourth reflecting surface, too, it is important to satisfy condition (23):

$$-0.1<DY4<0.1 \tag{23}$$

More preferably, it is important to satisfy condition (24):

$$-0.02<DY4<0.01 \tag{24}$$

In Example 4 of the present invention, given later, wherein a primary image-forming action is imparted to an inverting prism optical system from which an objective optical system is omitted, it is important to satisfy condition (25):

$$0<DY2<0.05 \tag{25}$$

This condition, too, is concerned with image distortion produced in a mountain or valley form, as in the case of condition (21). The upper and lower limits of condition (25) have the same meanings as mentioned in connection with condition (21). In Example 4 making no use of any objective optical system, however, a prism having a substantially intersecting optical path and a roof surface acts as a sort of objective optical system to form a primary image within two prisms. When a primary image is formed by a rotationally symmetric optical system as in other examples, no rotationally asymmetric image distortion is produced. In Example 4, however, a primary image is formed by a decentered prism having a substantially intersecting optical path, and so rotationally asymmetric image distortion is produced. Considerable image distortion, when introduced in the primary image, can never be corrected by a prism having an optical path that does not intersect, and acting as an ocular optical system.

Finally, the ratio between powers of the third and fourth reflecting surfaces at positions where an axial chief ray strike them is explained.

Here let Px34 and Py34 represent ratios between powers of the third and fourth reflecting surfaces in X and Y directions, respectively. It is then preferable to satisfy condition (26):

$$-2<Px34<2 \tag{26}$$

This condition has a close correlation with the relationship between an X-direction focal length and an eye point of an ocular optical system. When the lower limit of −2 is not reached, the overall power of an optical system becomes strong, and so make it possible to construct an ocular optical system of high magnification. However, the eye point becomes too short to observe an image. When the upper limit of 2 is exceeded, on the contrary, it is possible to obtain a certain eye point, but it is difficult to provide an ocular optical system of high magnification because the overall power of an optical system becomes too weak.

For the Y-direction, too, it is preferable to satisfy condition (27):

$$-1<Py34<3 \tag{27}$$

The upper and lower limits of this condition have the same meanings as mentioned for condition (26).

It is more preferable to satisfy conditions (28) and (29):

$$-1<Px34<1 \tag{28}$$

$$0<Py34<2 \tag{29}$$

In the practice of the present invention, it is preferable in view of aberration correction to satisfy one or more of conditions (1) to (29) mentioned above. It is most preferable to satisfy all conditions (1) to (29).

Still other objects and advantages of the present invention will in part be obvious and will in part be apparent from the specification.

The present invention accordingly comprises the features of construction, combinations of elements, and arrangement of parts which will be exemplified in the construction hereinafter set forth, and the scope of the present invention will be described in the claims.

BRIEF DESCRIPTION OF THE DRAWINGS

FIG. 5 is one part of a transverse aberration diagram of the prism optical system according to Example 1 of the present invention.

FIG. 6 is another part of the transverse aberration diagram of the prism optical system according to Example 1 of the present invention.

FIGS. 20(a) and 20(b) are schematics illustrative of binocular optical systems to which the second aspect of the present invention is applicable.

DESCRIPTION OF THE PREFERRED EMBODIMENTS

Examples 1 to 4, and 5 to 8 of the prism optical systems according to the present invention will now be explained.

Figure 9:
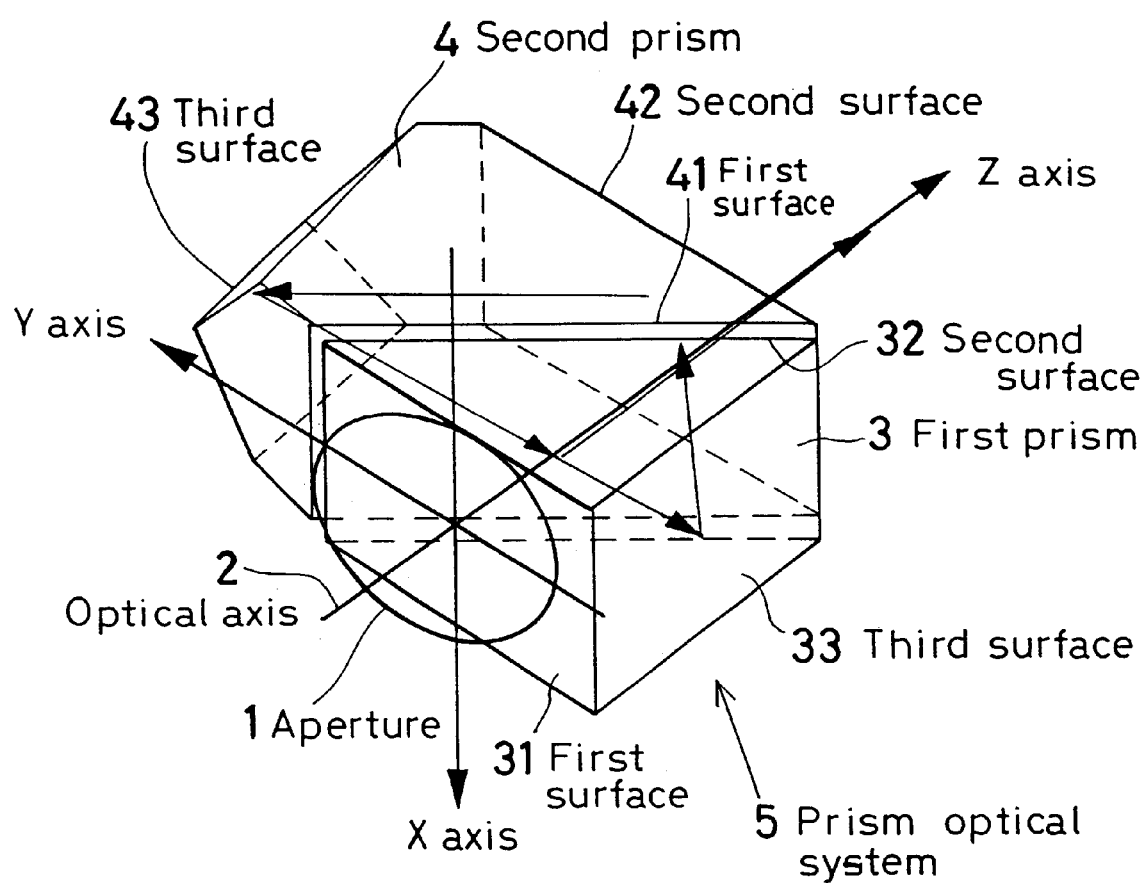
FIG. 9 is a schematic illustrative of a Schmidt prism that is a sort of inverting prism to which the first aspect of the present invention is applied.
Figure 10:
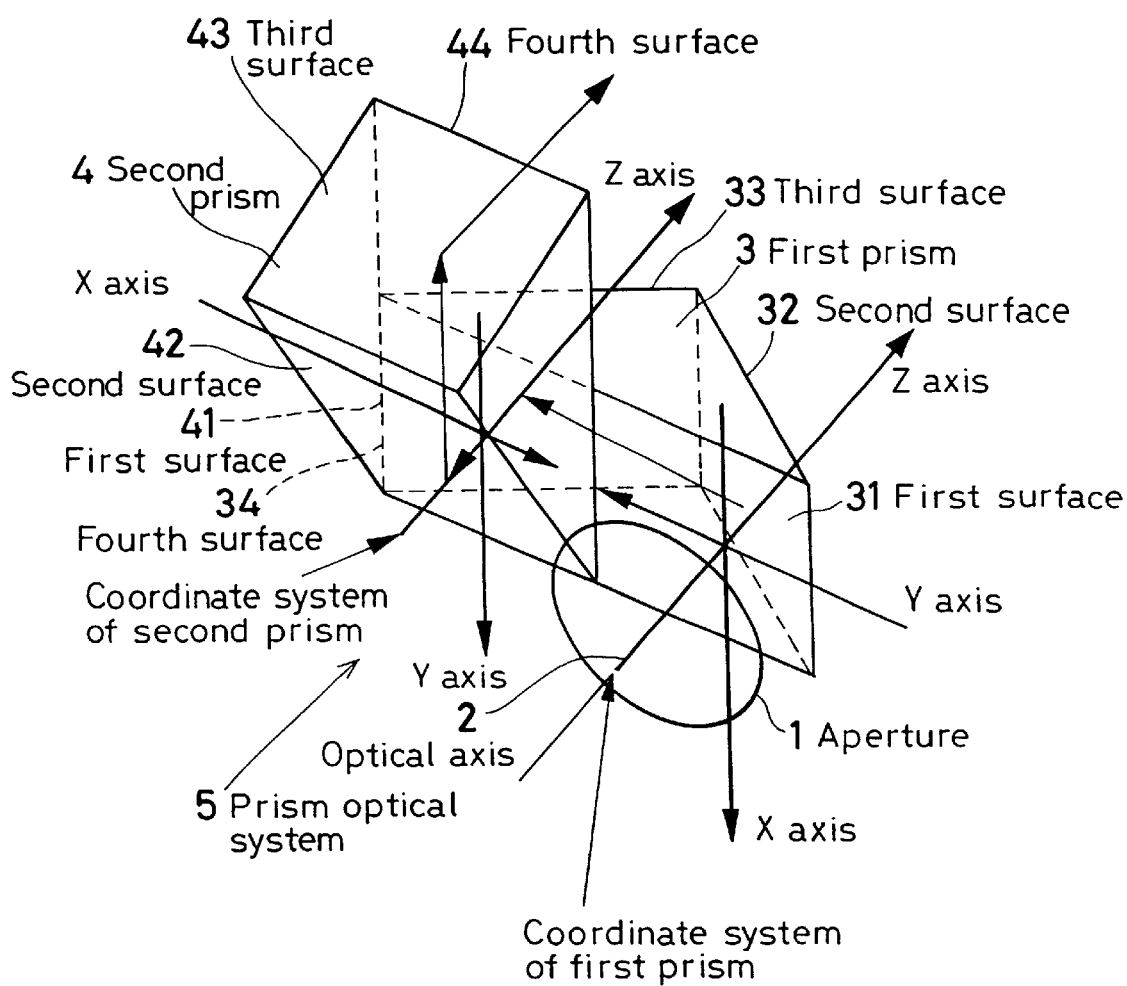
FIG. 10 is a schematic illustrative of a Porro prism that is a sort of inverting prism to which the first aspect of the present invention is applied.

Examples 1 and 2 of the prism optical system are those using a Schmidt prism shown in FIG. 9, and Examples 3 and 4 of the prism optical system are those using a Porro prism shown in FIG. 10. Examples 5 to 7 are those using an inverting prism for binoculars, and having an ocular optical system action added thereto. Example 8 is directed to an inverting prism for binoculars, which also acts as a combined objective and ocular optical system. It is understood, however, that an objective having a long focal length can be used for objectives in Examples 5 to 7 to construct the prism optical system of the present invention in the form of an ocular optical system for so-called high-magnification terrestrial telescopes. If the objective is constructed of a zooming optical system, it is then possible to design a zooming optical system or a real image type finder.

Figure 1:
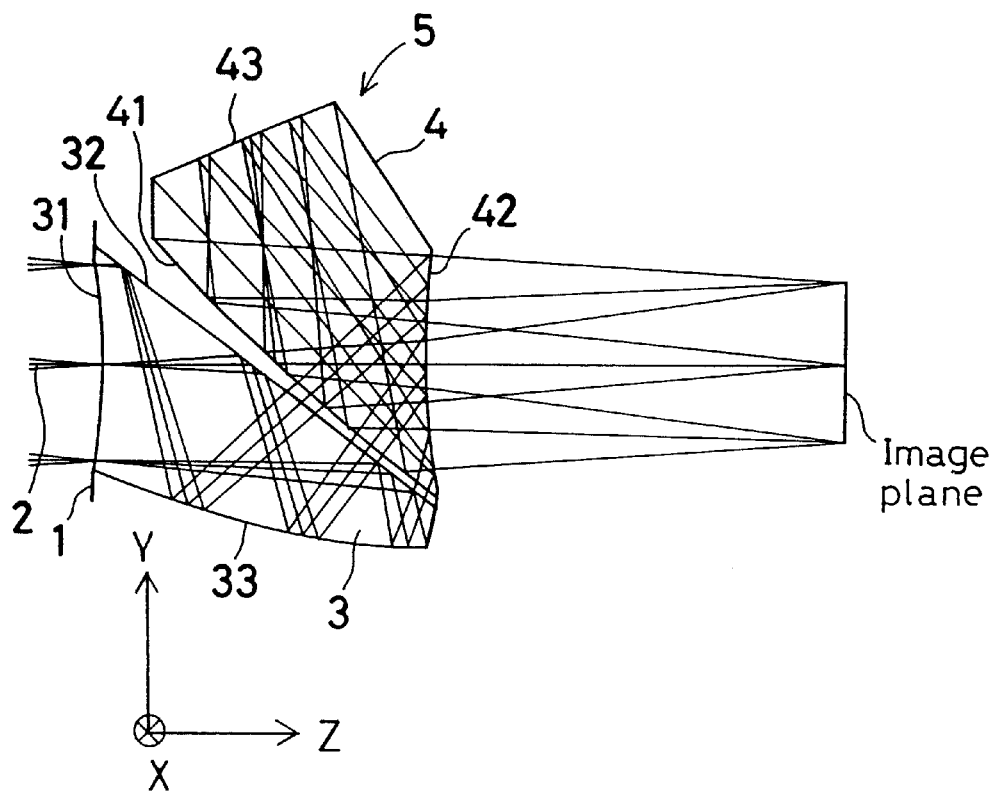
FIG. 1 is a sectional schematic illustrative of a prism optical system according to Example 1 of the present invention.

With reference here to constructional parameters in Examples 1 to 4 given later, the origin of a prism optical system 5 is defined by an apex of a first surface 31 of a first prism 3 therein, as shown in FIG. 1. An optical axis 2 is defined by a light ray leaving the center of an object (not shown) and passing through the origin; a Z-axis direction by a direction extending from the origin toward the optical axis 2; a Y-axis direction by a direction within a surface, which is perpendicular to the Z axis and passes through the origin, and in which the light ray is turned back by the first prism 3; an X-axis direction by a direction which is perpendicular to the Z and Y axes and passes through the origin; a Z-axis positive direction by a direction from the origin toward an image plane; a Y-axis positive direction by a direction from the optical axis 2 toward a second prism 4; and an X-axis positive direction by a direction which forms a right-hand system with the Z and Y axes. It is here noted that in Examples 3 and 4, between a fourth surface 34 of the first prism 3 and a first surface 41 (aperture 1) of a second prism 4 there is a virtual surface, at which the coordinate system is rotated through 90° in the counterclockwise direction around the Z axis ($\gamma=-90°$; $\gamma$ represents the amount of the coordinate system rotated around the Z axis with the positive direction defined by a clockwise direction). The thus changed coordinate will hereinafter be used.

Figure 13:
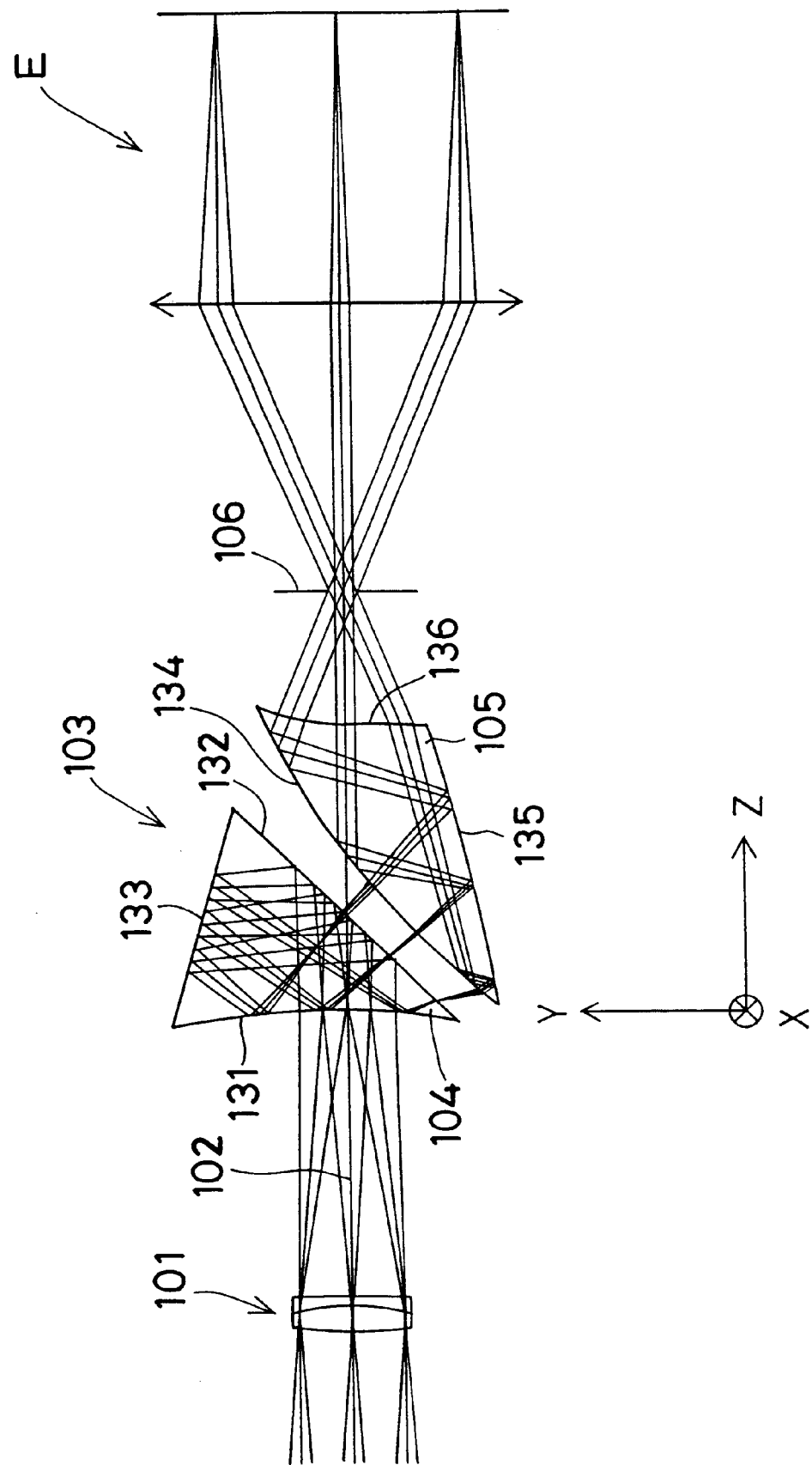
FIG. 13 is a sectional schematic illustrative of a prism optical system according to Example 5 of the present invention.

With reference then to constructional parameters in Examples 5 to 8 hereinafter set forth, surface Numbers ("Nos.") follow the order of traveling of light rays. A coaxial portion of a surface is shown by the radius of curvature of that surface, the axial separation between that surface and the next surface, and the refractive index and Abbe's number of a medium following that surface, as commonly used in the art. For a decentered portion of that surface, suppose that, as shown in FIG. 13, the origin of a prism optical system 103 is defined by an apex of a first surface 131 of a first prism 104 therein; an optical path 102 by a light ray leaving the center of an object (not shown) and passing through the origin; a Z-axis direction by a direction extending from the origin along the optical axis 102; a Y-axis direction by a direction within a surface, which is perpendicular to the Z axis and passes through the origin, and in which the light ray is turned back by the first prism 3; an X-axis direction by a direction which is perpendicular to the Z and Y axes and passes through the origin; a Z-axis positive direction by a direction from the origin toward an image plane; a Y-axis positive direction by a direction from the optical axis 102 toward a second prism 105; and an X-axis positive direction by a direction which forms a right-hand system with the Z and Y axes.

With respect to the decentering of each surface, the amounts of decentering of the surface from the apex origin in the X-, Y-, and Z-axis directions and the amount of rotation of the center axis of the surface around the X axis are given by $\alpha$. The positive direction in this case is defined by a counterclockwise rotation.

It is noted that the shape of a three-dimensional surface is defined by polynomial (a) mentioned above, and the axis of that three-dimensional surface is given by the Z axis in that defining polynomial. It is also noted that terms with respect to aspheric surfaces, about which no data are given, are zero. The index of refraction is given by a d-line refractive index (wavelength: 587.56 nm), and length unit is millimeter.

Figure 2:
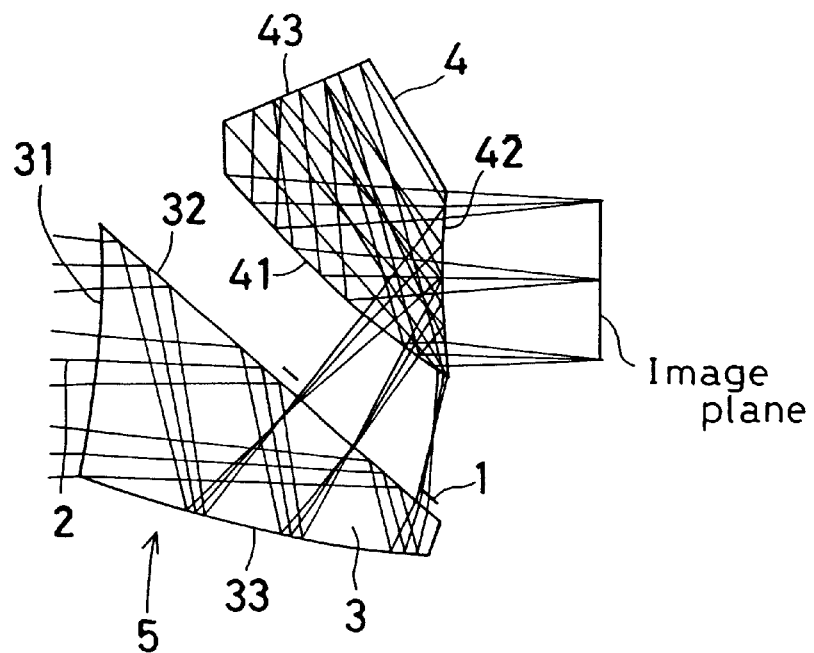
FIG. 2 is a sectional schematic illustrative of a prism optical system according to Example 2 of the present invention.

Examples 1 and 2 are each directed to a prism optical system 5 comprising a Schmidt prism shown in FIG. 9, and FIGS. 1 and 2 are Y-Z sectional schematics of Examples 1 and 2, respectively. Each or the prism optical system 5 comprises two prisms, i.e., a first prism 3 and a second prism 4. The first prism 3 comprises three surfaces, i.e., a transmitting or first surface 31, a second surface 32 which acts as a combined reflecting and transmitting surface, and a reflecting or third surface 33 while the second prism 4 comprises three surfaces, i.e., a first surface 41 that acts as a combined transmitting and reflecting surface, a second surface 42 that acts as a combined reflecting and transmitting surface, and a third surface 43 made up of a roof surface (or four surfaces when the roof surface is counted as two surfaces). Separations between these three surfaces of each prism are filled with media having a refractive index that is greater than 1. Upon leaving an object and striking the first surface 31 of the first prism 3, light is reflected at the second surface 32 and then at the third surface 33. The reflected light now transmits through the second surface 32 and leaves the first prism 3. Subsequently, the transmitted light goes into the second prism 4 through the first surface 41 thereof in opposition to the second surface 32 of the first prism 3, is reflected at the second surface 42 and then at the third surface 43. The light is now reflected at the first surface 41, and finally transmits through the second surface 42 to form an object image on an image plane. An aperture 1 is positioned on the first surface 31 of the first prism 3 in Example 1, and between the first and second prisms 3 and 4 in Example 2.

Figure 3:
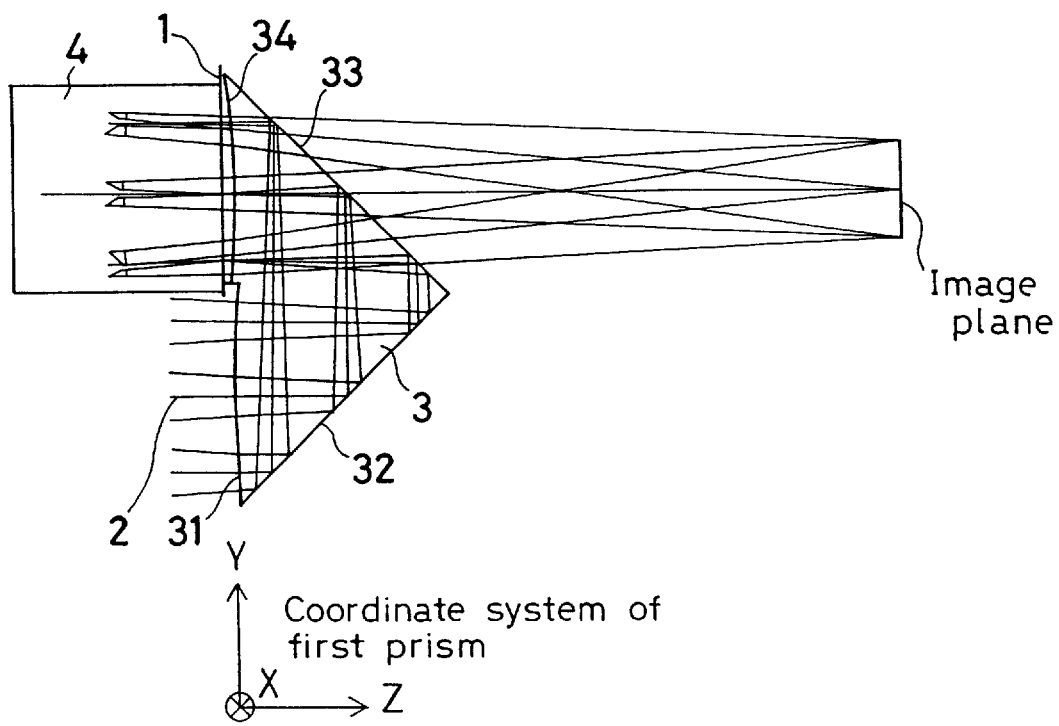
FIGS. 3(a) and 3(b), referred to collectively as FIG. 3, are plan schematics illustrative of a prism optical system according to Example 3 of the present invention.
Figure 3:
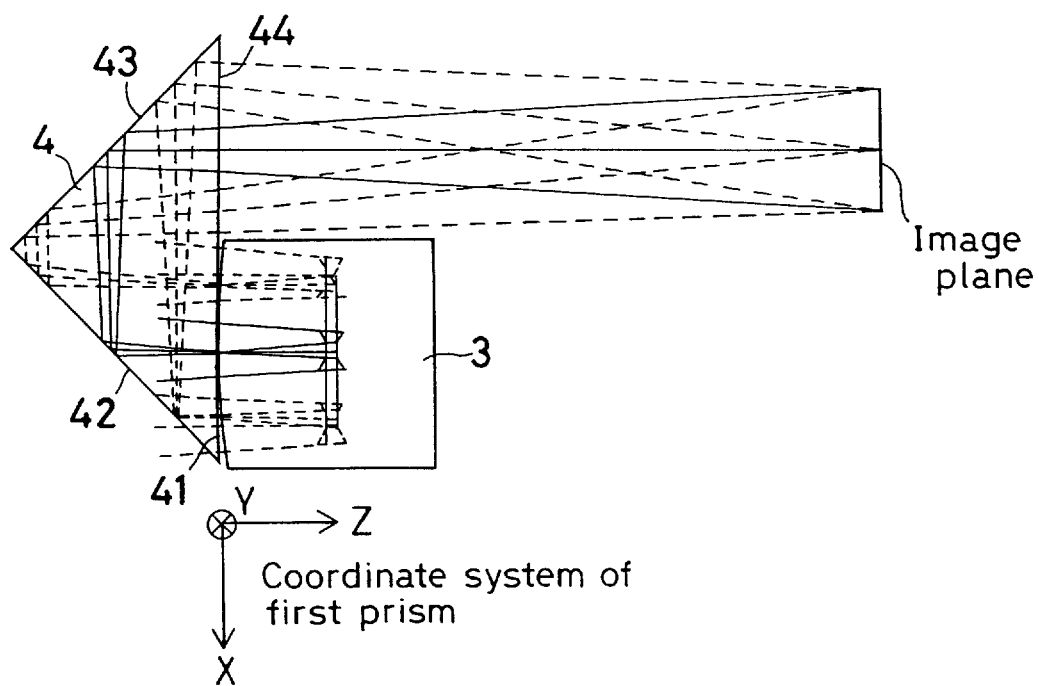
Figure 4A:
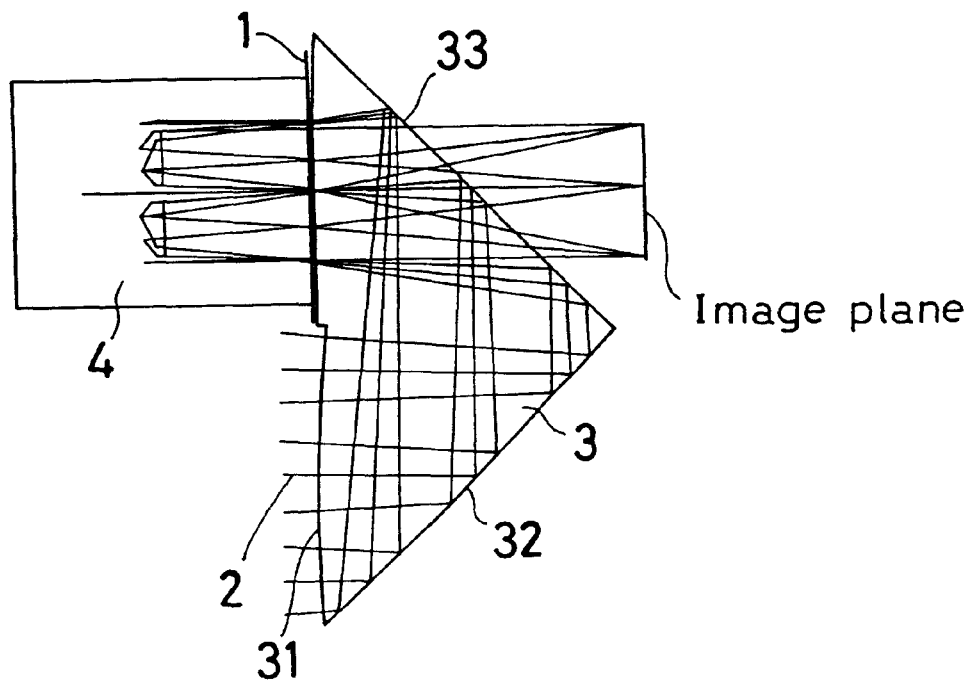
FIGS. 4(a) and 4(b), referred to collectively as FIG. 4, are plan schematics illustrative of a prism optical system according to Example 4 of the present invention.
Figure 4B:
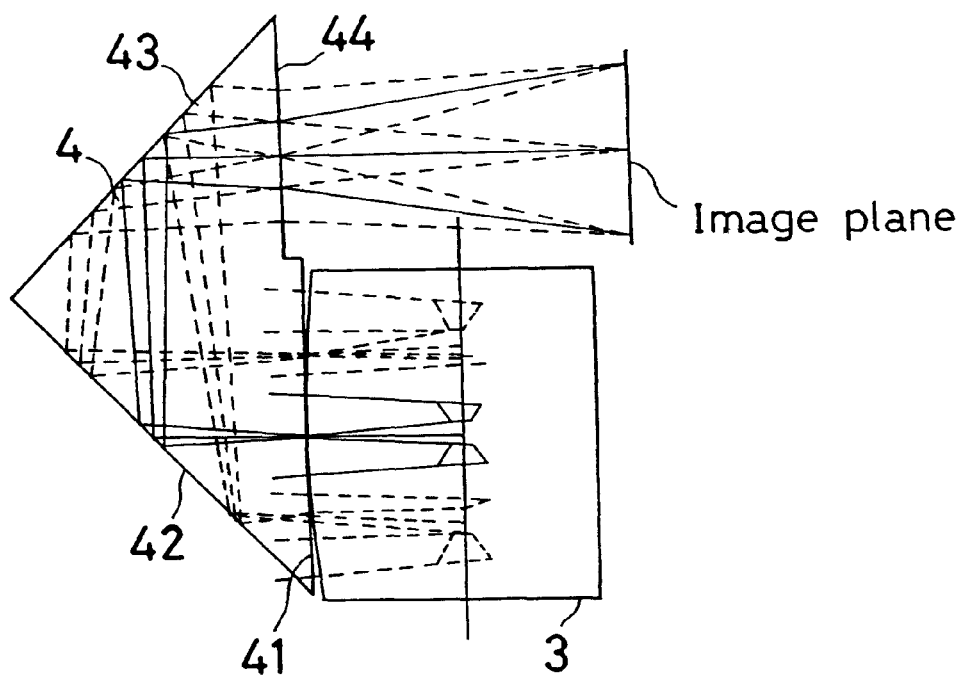
Figure 7:
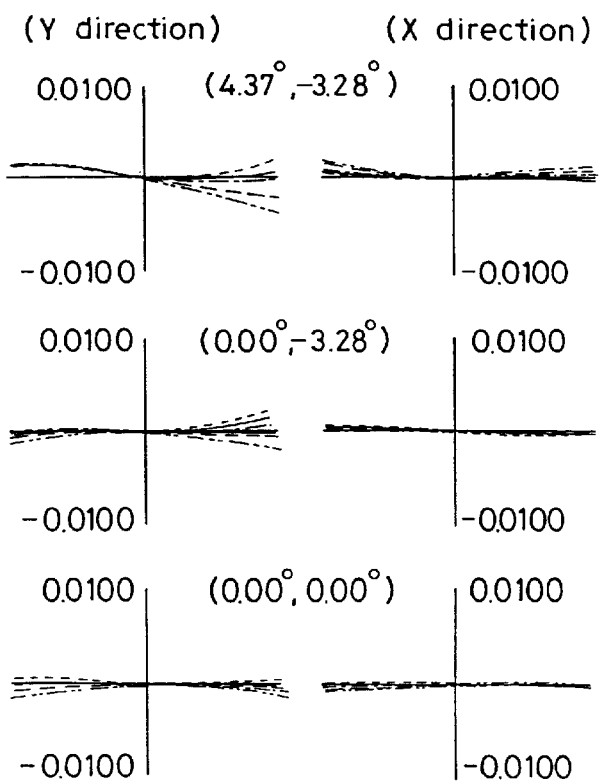
FIG. 7 is one part of a transverse aberration diagram of the prism optical system according to Example 3 of the present invention.
Figure 8:
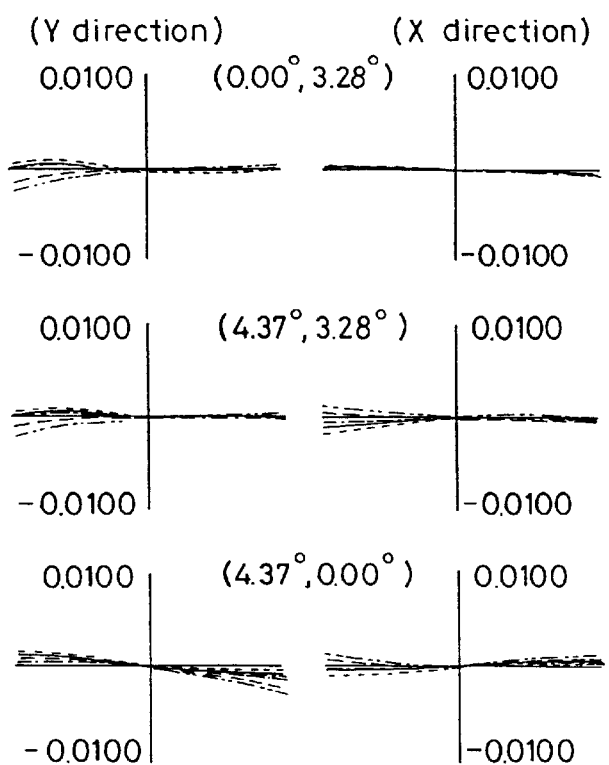
FIG. 8 is another part of the transverse aberration diagram of the prism optical system according to Example 3 of the present invention.

Examples 3 and 4 are each directed to a prism optical system 5 comprising a Porro prism shown in FIG. 10, and FIGS. 3, and 4 are a Y-Z plan schematic (a) and an X-Z plan schematic (b) of Examples 3, and 4, respectively. Each or the prism optical system 5 comprises two prisms, i.e., a first prism 3 and a second prism 4. The first prism 3 comprises four surfaces, i.e., a transmitting or first surface 31, a reflecting or second surface 32, a reflecting or third surface 33, and a transmitting or fourth surface 34. The second prism 4 again comprises four surfaces, i.e., a transmitting or first surface 41, a reflecting or second surface 42, a reflecting or third surface 43, and a transmitting or fourth surface 44. Separations between these four surfaces of each prism are filled with media having a refractive index that is greater than 1. Upon leaving an object and striking the first surface 31 of the first prism 3, light is reflected at the second and third surfaces 32 and 33, and leaves the first prism 3 upon transmitting through the fourth surface 34. Thereupon, the light goes into the second prism 42 of the second prism 4 from the first surface 41 thereof in opposition to the fourth surface 34 of the first prism 3, is reflected at the second and third surfaces 42 and 43, and finally transmits through the fourth surface 44 to form an object image on an image plane. An aperture 1 is positioned on the first surface 41 of the second prism 4 in both Examples 3 and 4.

Examples 1 to 4 mentioned above are all constructed of three-dimensional surfaces except the third surfaces 43 of the second prisms 4 in Examples 1 and 2 which are roof surfaces. It is noted that in Examples 1 and 3 the phototaking field angle is 6.55° for the horizontal field angle and 8.73° for the vertical field angle and the pupil diameter is 12 mm, and in Examples 3 and 4 the phototaking field angle is 8.73° for the horizontal field angle and 6.55° for the vertical field angle and the pupil diameter is 12 mm.

Examples 5 to 8 shown in FIGS. 13 to 16 are each directed to a prism optical system 103 comprising a Schmidt prism having a finite focal length so as to act as an ocular optical system. A first prism 104 of two prisms 104 and 105 comprises a first surface 131 that acts as a combined transmitting and reflecting surface, a second surface 132 that acts as a combined reflecting and transmitting surface, and a reflecting or third surface 133 that is constructed of a roof surface. Upon striking the first surface 131, an axial chief ray is total reflected at the second surface 132, reflected at the second surface 132, total reflected at the first surface 131, transmits through the second surface 132, and strikes the second prism 105 in the described order. In the first prism 104, an axial chief ray traveling at the first time from the first surface 131 to the second surface 132 intersects an axial chief ray traveling from the third surface 133 to the second surface 132 or an axial chief ray traveling at the second time from the first surface 131 to the second surface 132.

The second prism 105 comprises a first surface 134 that acts as a combined transmitting and reflecting surface, a reflecting or second surface 135, and a transmitting or third surface 136. Upon striking the first surface 134, an axial chief ray is reflected at the second surface 135 and total reflected at the first surface 134, transmits through the third surface 136, and reaches an exit pupil 106 in the described order. In the second prism 105, an axial chief ray traveling from the first surface 134 to the second surface 135 does not intersect an axial chief ray traveling from the first surface 134 to the third surface 136.

In each of Examples 5 to 8 given later, the first and second surfaces 131 and 132 of the first prism 104, and the first, second and third surfaces 134, 135 and 136 of the second prism 105 are all made up of three-dimensional surfaces. In this case, the second and first surfaces 132 and 131 of the first prism 104 acting as reflecting surfaces, and the second and first surfaces 135 and 134 of the second prism 105 form the aforesaid first, second, third, and fourth reflecting surfaces, respectively.

Y-Z sections of the optical systems according to Examples 5 to 8 are shown in FIGS. 13 to 16 wherein 101, 102, 106, and E represent an objective, an optical axis, an optical system's exist pupil, and an observer's eyeball, respectively.

Figure 14:
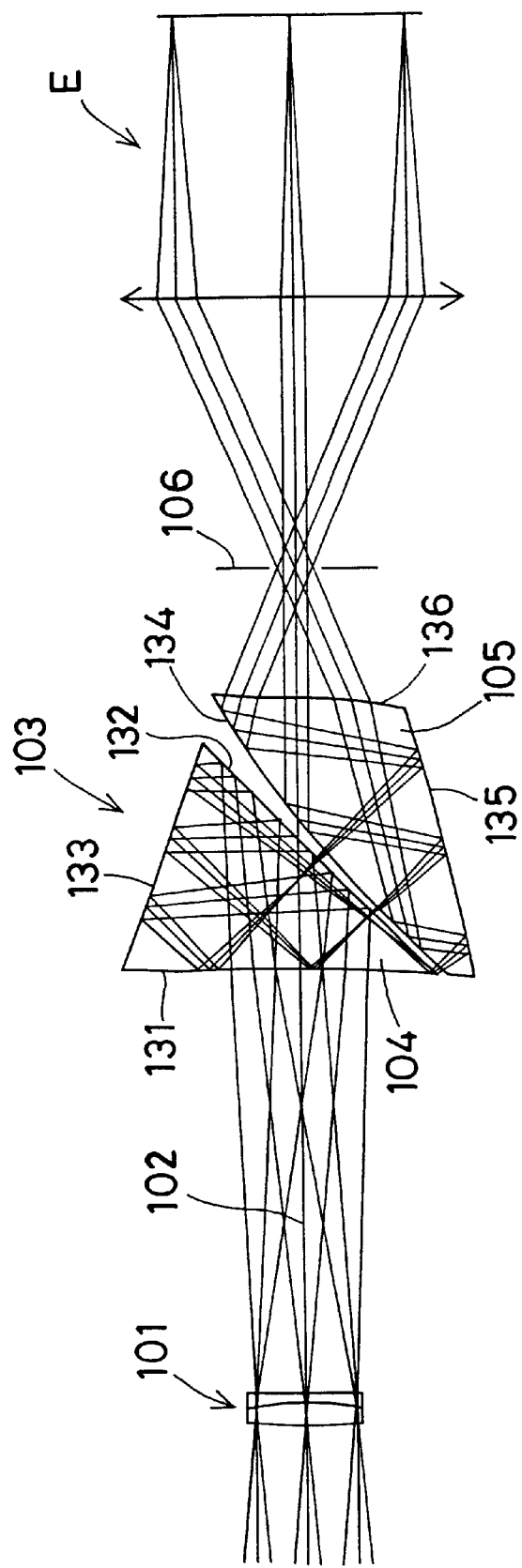
FIG. 14 is a sectional schematic illustrative of a prism optical system according to Example 6 of the present invention.
Figure 15:
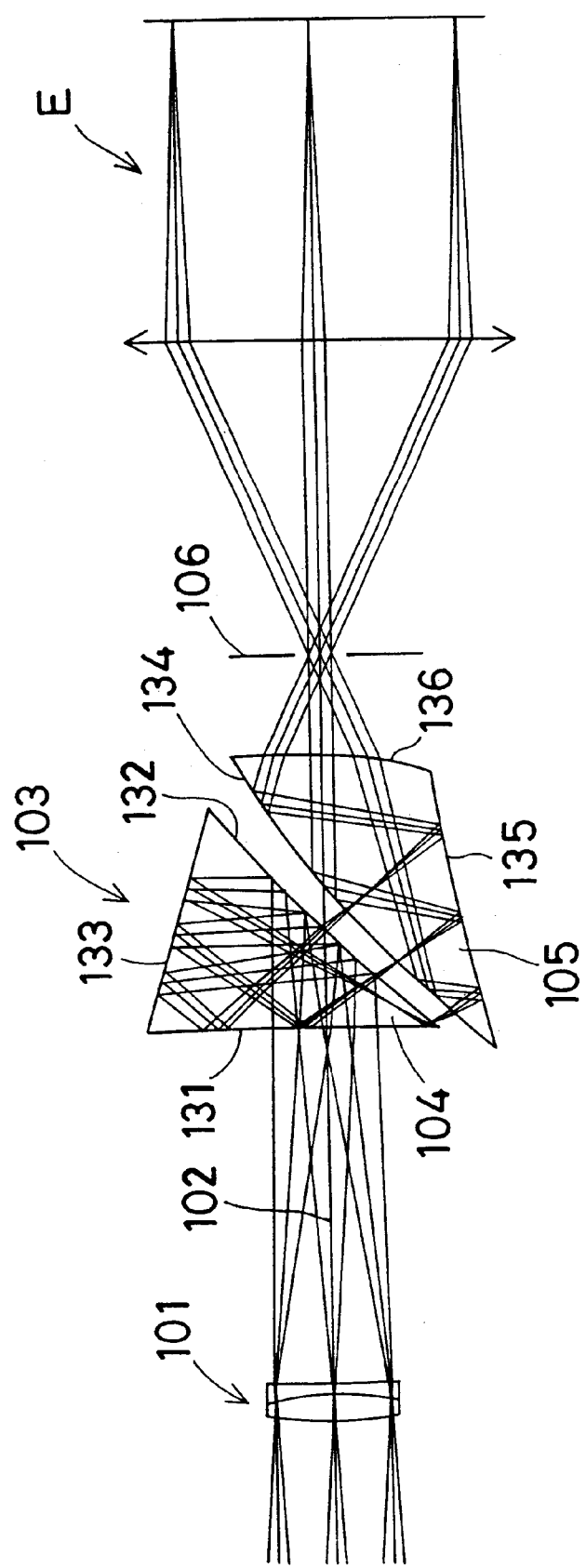
FIG. 15 is a plan schematic illustrative of a prism optical system according to Example 7 of the present invention.

As depicted in FIGS. 13 to 15, Examples 5 to 7 each comprise an objective 101 and a prism optical system 103 acting as a combined inverting prism and ocular optical system. The objective 101 comprises a doublet consisting of a double-convex lens and a negative meniscus lens convex on an image side thereof, and the prism optical system 103 has a Schmidt prism shape such as one mentioned above.

Figure 16:
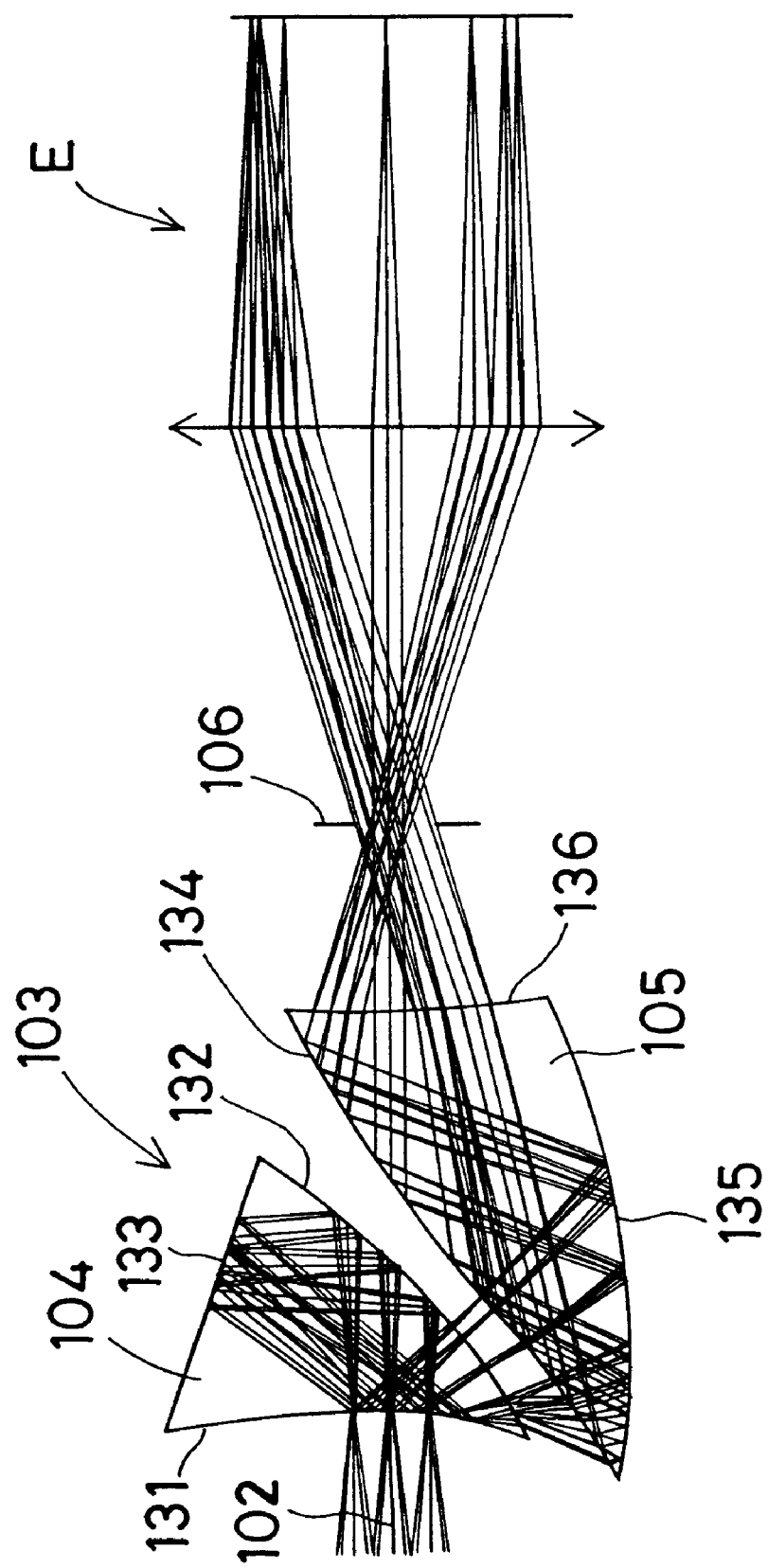
FIG. 16 is a plan schematic illustrative of a prism optical system according to Example 8 of the present invention.

As depicted in FIG. 16, Example 8 consists of an objective optical system and a prism optical system 103 acting as a combined inverting prism and ocular optical system. The prism optical system 103 has a Schmidt prism shape such as one mentioned above.

In Example 5 the phototaking field angle is 4.36° for the horizontal half field angle and 3.27° for the vertical half field angle, the entrance pupil diameter is 12 mm, the field angle of view is 23.4°×19.24°, and the magnification is about 5.5.

In Example 6 the phototaking field angle is 6.10° for the horizontal half field angle and 4.70° for the vertical half field angle, the entrance pupil diameter is 12 mm, the field angle of view is 23.4°×19.24°, and the magnification is about 4.

In Example 7 the phototaking field angle is 4.36° for the horizontal half field angle and 3.27° for the vertical half field angle, the entrance pupil diameter is 12 mm, the field angle of view is 24.19°×17.93°, and the magnification is about 5.5.

In Example 8 the phototaking field angle is 6.7° for the horizontal half field angle and 5.0° for the vertical half field angle, the entrance pupil diameter is 9 mm, the field angle of view is 17.7°×13.3°, and the magnification is about 2.6.

It is noted that throughout Examples 5 to 8 the virtual image to be observed is formed at a position 1 meter away from the object side.

Set out below are the constructional parameters in Examples 1 to 8.

EXAMPLE 1

| Surface No. | Radius of curvature | Surface separation | Refractive index | Abbe's No. |
|---|---|---|---|---|
| Object plane | ∞ | ∞ | | |
| 1 | Three-dimensional surface (1) Aperture Diaphragm plane) Transmitting surface | | 1.52540 | 55.78 |
| 2 | Three-dimensional surface (2) Displacement and tilt (1) Reflecting surface | | 1.52540 | 55.78 |
| 3 | Three-dimensional surface (3) Displacement and tilt (2) Reflecting surface | | 1.52540 | 55.78 |
| 4 | Three-dimensional surface (2) Displacement and tilt (1) Transmitting surface | | | |

| | | | | |
|---|---|---|---|---|
| 5 | Three-dimensional surface (4) Displacement and tilt (3) Transmitting surface | | 1.52540 | 55.78 |
| 6 | Three-dimensional surface (5) Displacement and tilt (4) Reflecting surface | | 1.52540 | 55.78 |
| 7 | ∞ Displacement and tilt (5) Reflecting surface | | 1.52540 | 55.78 |
| 8 | Three-dimensional surface (4) Displacement and tilt (3) Reflecting surface | | 1.52540 | 55.78 |
| 9 | Three-dimensional surface (5) Displacement and tilt (4) Transmitting surface | | | |
| Image plane | ∞ Displacement and tilt (6) | | | |

Three-dimensional surface (1)

| | | | | | | |
|---|---|---|---|---|---|---|
| $C_5$ | $-1.2672 \times 10^{-2}$ | $C_7$ | $-2.4694 \times 10^{-3}$ | $C_8$ | $1.9822 \times 10^{-4}$ |
| $C_{10}$ | $-1.5083 \times 10^{-4}$ | $C_{12}$ | $5.4976 \times 10^{-5}$ | $C_{14}$ | $2.2634 \times 10^{-5}$ |
| $C_{16}$ | $-8.2911 \times 10^{-7}$ | $C_{17}$ | $5.6469 \times 10^{-6}$ | $C_{19}$ | $3.0942 \times 10^{-6}$ |
| $C_{21}$ | $7.9423 \times 10^{-7}$ | | | | |

Three-dimensional surface (2)

| | | | | | | |
|---|---|---|---|---|---|---|
| $C_5$ | $-1.6754 \times 10^{-3}$ | $C_7$ | $-3.6548 \times 10^{-3}$ | $C_8$ | $4.3133 \times 10^{-5}$ |
| $C_{10}$ | $8.0769 \times 10^{-5}$ | $C_{12}$ | $3.4304 \times 10^{-6}$ | $C_{14}$ | $3.6553 \times 10^{-6}$ |
| $C_{16}$ | $9.6636 \times 10^{-7}$ | $C_{17}$ | $1.2202 \times 10^{-7}$ | $C_{19}$ | $1.9265 \times 10^{-7}$ |
| $C_{21}$ | $2.0913 \times 10^{-7}$ | | | | |

Three-dimensional surface (3)

| | | | | | | |
|---|---|---|---|---|---|---|
| $C_5$ | $6.5630 \times 10^{-3}$ | $C_7$ | $-1.5128 \times 10^{-3}$ | $C_8$ | $-1.4118 \times 10^{-4}$ |
| $C_{10}$ | $1.2660 \times 10^{-4}$ | $C_{12}$ | $1.8982 \times 10^{-5}$ | $C_{14}$ | $6.8144 \times 10^{-6}$ |
| $C_{16}$ | $5.2233 \times 10^{-7}$ | $C_{17}$ | $-7.8296 \times 10^{-7}$ | $C_{19}$ | $-3.3872 \times 10^{-7}$ |
| $C_{21}$ | $1.2250 \times 10^{-7}$ | | | | |

Three-dimensional surface (4)

| | | | | | | |
|---|---|---|---|---|---|---|
| $C_5$ | $3.8047 \times 10^{-3}$ | $C_7$ | $-2.6090 \times 10^{-3}$ | $C_8$ | $-2.4041 \times 10^{-6}$ |
| $C_{10}$ | $3.2978 \times 10^{-6}$ | $C_{12}$ | $1.6621 \times 10^{-6}$ | | |
| $C_{16}$ | $-5.1102 \times 10^{-7}$ | $C_{17}$ | $-9.6361 \times 10^{-8}$ | $C_{19}$ | $-2.9727 \times 10^{-8}$ |
| $C_{21}$ | $4.9809 \times 10^{-8}$ | | | | |

Three-dimensional surface (5)

| | | | | | | |
|---|---|---|---|---|---|---|
| $C_5$ | $1.0138 \times 10^{-2}$ | $C_7$ | $-4.0864 \times 10^{-3}$ | $C_8$ | $-3.1166 \times 10^{-4}$ |
| $C_{10}$ | $1.2642 \times 10^{-4}$ | $C_{12}$ | $2.7031 \times 10^{-5}$ | | |
| $C_{16}$ | $5.3789 \times 10^{-7}$ | $C_{17}$ | $-8.3168 \times 10^{-7}$ | $C_{19}$ | $1.5190 \times 10^{-7}$ |
| $C_{21}$ | $4.9311 \times 10^{-9}$ | | | | |

| | X | Y | Z | α(°) |
|---|---|---|---|---|
| Displacement and tilt (1) | 0.0000 | 0.0000 | 9.6081 | 53.5671 |
| Displacement and tilt (2) | 0.0000 | −10.6887 | 12.9033 | 79.5124 |
| Displacement and tilt (3) | 0.0000 | 0.0000 | 11.0438 | 48.1028 |
| Displacement and tilt (4) | 0.0000 | 0.0000 | 20.9895 | 0.0000 |
| Displacement and tilt (5) | 0.0000 | 13.9044 | 9.5319 | −67.5000 |
| Displacement and tilt (6) | 0.0000 | 0.0000 | 47.6929 | 0.0000 |

EXAMPLE 2

| Surface No. | Radius of curvature | Surface separation | Refractive index | Abbe's No. |
|---|---|---|---|---|
| Object plane | ∞ | ∞ | | |
| 1 | Three-dimensional surface (1) Transmitting surface | | 1.52540 | 55.78 |
| 2 | Three-dimensional surface (2) Displacement and tilt (1) Reflecting surface | | 1.52540 | 55.78 |
| 3 | Three-dimensional surface (3) Displacement and tilt (2) Reflecting surface | | 1.52540 | 55.78 |
| 4 | Three-dimensional surface (2) Displacement and tilt (1) Transmitting surface | | | |
| 5 | ∞ Displacement and tilt (3) Aperture (Diaphragm plane) | | | |
| 6 | Three-dimensional surface (4) Displacement and tilt (4) Transmitting surface | | 1.52540 | 55.78 |
| 7 | Three-dimensional surface (5) Displacement and tilt (5) Reflecting surface | | 1.52540 | 55.78 |
| 8 | ∞ Displacement and tilt (6) Reflecting surface | | 1.52540 | 55.78 |
| 9 | Three-dimensional surface (4) Displacement and tilt (4) Reflecting surface | | 1.52540 | 55.78 |
| 10 | Three-dimensional surface (5) Displacement and tilt (5) Transmitting surface | | | |
| Image plane | ∞ Displacement and tilt (7) | | | |

Three-dimensional surface (1)

| | | | | | | |
|---|---|---|---|---|---|---|
| $C_5$ | $-8.4338 \times 10^{-3}$ | $C_7$ | $7.2691 \times 10^{-3}$ | $C_8$ | $4.9129 \times 10^{-4}$ |
| $C_{10}$ | $-5.6806 \times 10^{-4}$ | $C_{12}$ | $8.4037 \times 10^{-5}$ | $C_{14}$ | $-3.9580 \times 10^{-5}$ |
| $C_{16}$ | $-2.4513 \times 10^{-6}$ | $C_{17}$ | $3.3639 \times 10^{-6}$ | $C_{19}$ | $-1.4356 \; 10^{-6}$ |
| $C_{21}$ | $4.6090 \times 10^{-8}$ | | | | |

Three-dimensional surface (2)

| | | | | | | |
|---|---|---|---|---|---|---|
| $C_5$ | $-1.6485 \times 10^{-3}$ | $C_7$ | $-5.7123 \times 10^{-3}$ | $C_8$ | $2.0846 \times 10^{-5}$ |
| $C_{10}$ | $5.7306 \times 10^{-5}$ | $C_{12}$ | $3.8048 \times 10^{-6}$ | $C_{14}$ | $-5.9229 \times 10^{-6}$ |
| $C_{16}$ | $8.3327 \times 10^{-7}$ | $C_{17}$ | $4.3404 \times 10^{-8}$ | $C_{19}$ | $-8.7139 \times 10^{-8}$ |
| $C_{21}$ | $1.2811 \times 10^{-7}$ | | | | |

Three-dimensional surface (3)

| | | | | | | |
|---|---|---|---|---|---|---|
| $C_5$ | $7.1321 \times 10^{-3}$ | $C_7$ | $-7.5450 \times 10^{-3}$ | $C_8$ | $-2.4375 \times 10^{-4}$ |
| $C_{10}$ | $1.4177 \times 10^{-4}$ | $C_{12}$ | $6.7969 \times 10^{-6}$ | $C_{14}$ | $7.9771 \times 10^{-6}$ |
| $C_{16}$ | $2.3814 \times 10^{-7}$ | $C_{17}$ | $-6.7217 \times 10^{-8}$ | $C_{19}$ | $-2.4099 \times 10^{-7}$ |
| $C_{21}$ | $2.1750 \times 10^{-7}$ | | | | |

Three-dimensional surface (4)

| | | | | | | |
|---|---|---|---|---|---|---|
| $C_5$ | $5.6909 \times 10^{-3}$ | $C_7$ | $-6.3367 \times 10^{-3}$ | $C_8$ | $-7.5474 \times 10^{-5}$ |
| $C_{10}$ | $-8.8192 \times 10^{-6}$ | $C_{12}$ | $-4.1440 \times 10^{-6}$ | | |
| $C_{16}$ | $-8.5026 \times 10^{-6}$ | $C_{17}$ | $-4.2168 \times 10^{-7}$ | $C_{19}$ | $2.0300 \times 10^{-7}$ |
| $C_{21}$ | $3.0959 \times 10^{-7}$ | | | | |

Three-dimensional surface (5)

| | | | | | | |
|---|---|---|---|---|---|---|
| $C_5$ | $1.0838 \times 10^{-2}$ | $C_7$ | $-6.6868 \times 10^{-3}$ | $C_8$ | $-3.3957 \times 10^{-4}$ |
| $C_{10}$ | $2.3590 \times 10^{-4}$ | $C_{12}$ | $-4.8016 \times 10^{-6}$ | | |
| $C_{16}$ | $-1.7332 \times 10^{-7}$ | $C_{17}$ | $-6.5143 \times 10^{-8}$ | $C_{19}$ | $5.3375 \times 10^{-7}$ |
| $C_{21}$ | $1.2878 \times 10^{-7}$ | | | | |

| | X | Y | Z | α(°) |
|---|---|---|---|---|
| Displacement and tilt (1) | 0.0000 | 0.0000 | 3.7369 | 50.8281 |
| Displacement and tilt (2) | 0.0000 | −16.5960 | 12.6304 | 78.3384 |
| Displacement and tilt (3) | 0.0000 | −10.1084 | 16.9474 | 48.8210 |
| Displacement and tilt (4) | 0.0000 | 0.0000 | 14.6074 | 49.3989 |
| Displacement and tilt (5) | 0.0000 | 0.0000 | 22.2261 | 0.0000 |
| Displacement and tilt (6) | 0.0000 | 11.4591 | 12.8339 | −67.5000 |
| Displacement and tilt (7) | 0.0000 | 0.0000 | 32.0261 | 0.0000 |

EXAMPLE 3

| Surface No. | Radius of curvature | Surface separation | Refractive index | Abbe's No. |
|---|---|---|---|---|
| Object plane | ∞ | ∞ | | |
| 1 | Three-dimensional surface (1) Transmitting surface | | 1.52540 | 55.78 |

-continued

| | | | | | |
|---|---|---|---|---|---|
| 2 | Three-dimensional surface (2) Displacement and tilt (1) Reflecting surface | | | 1.52540 | 55.78 |
| 3 | Three-dimensional surface (3) Displacement and tilt (2) Reflecting surface | | | 1.52540 | 55.78 |
| 4 | Three-dimensional surface (4) Displacement and tilt (3) Transmitting surface | | | | |
| 5 | Hypothetic plane (Coordinate transformation) | $\gamma = -90°$ | | | |
| 6 | Three-dimensional surface (5) Displacement and tilt (4) Aperture (Diaphragm plane) Transmitting surface | | | 1.52540 | 55.78 |
| 7 | Three-dimensional surface (6) Displacement and tilt (5) Reflecting surface | | | 1.52540 | 55.78 |
| 8 | Three-dimensional surface (7) Displacement and tilt (6) Reflecting surface | | | 1.52540 | 55.78 |
| 9 | Three-dimensional surface (8) Displacement and tilt (7) Transmitting surface | | | | |
| Image plane | $\infty$ Displacement and tilt (8) | | | | |

Three-dimensional surface (1)

$C_5$ $6.3478 \times 10^{-3}$ $C_7$ $6.1098 \times 10^{-3}$ $C_8$ $-5.2845 \times 10^{-5}$
$C_{10}$ $4.3671 \times 10^{-5}$ $C_{12}$ $-1.0668 \times 10^{-6}$ $C_{14}$ $-6.5356 \times 10^{-6}$
$C_{16}$ $-8.0227 \times 10^{-8}$ Three-dimensional surface (2)

$C_5$ $3.3439 \times 10^{-4}$ $C_7$ $1.1954 \times 10^{-4}$ $C_8$ $-7.6601 \times 10^{-7}$
$C_{10}$ $2.3193 \times 10^{-5}$ $C_{12}$ $-6.4152 \times 10^{-8}$ $C_{14}$ $3.9565 \times 10^{-8}$
$C_{16}$ $2.1228 \times 10^{-7}$ Three-dimensional surface (3)

$C_5$ $-1.9344 \times 10^{-3}$ $C_7$ $-1.3011 \times 10^{-4}$ $C_8$ $1.4449 \times 10^{-6}$
$C_{10}$ $3.7046 \times 10^{-5}$ $C_{12}$ $-3.2961 \times 10^{-8}$ $C_{14}$ $1.7349 \times 10^{-7}$
$C_{16}$ $2.2626 \times 10^{-7}$ Three-dimensional surface (4)

$C_5$ $-6.9225 \times 10^{-3}$ $C_7$ $-1.6391 \times 10^{-3}$ $C_8$ $-2.7289 \times 10^{-5}$
$C_{10}$ $1.2587 \times 10^{-4}$ $C_{12}$ $1.4172 \times 10^{-6}$ $C_{14}$ $1.3824 \times 10^{-5}$
$C_{16}$ $1.5349 \times 10^{-6}$ Three-dimensional surface (5)

$C_5$ $1.4944 \times 10^{-2}$ $C_7$ $8.8404 \times 10^{-3}$ $C_8$ $4.1480 \times 10^{-5}$
$C_{10}$ $-1.4278 \times 10^{-4}$ $C_{12}$ $2.8749 \times 10^{-6}$ $C_{14}$ $8.8455 \times 10^{-6}$
$C_{16}$ $4.0113 \times 10^{-6}$ Three-dimensional surface (6)

$C_5$ $1.0955 \times 10^{-3}$ $C_7$ $2.9999 \times 10^{-3}$ $C_8$ $-1.3343 \times 10^{-5}$
$C_{10}$ $-4.1797 \times 10^{-5}$ $C_{12}$ $9.3618 \times 10^{-8}$ $C_{14}$ $3.9593 \times 10^{-7}$
$C_{16}$ $7.8035 \times 10^{-8}$ Three-dimensional surface (7)

$C_5$ $2.0731 \times 10^{-3}$ $C_7$ $3.1675 \times 10^{-3}$ $C_8$ $-5.4006 \times 10^{-6}$
$C_{10}$ $-2.7537 \times 10^{-6}$ $C_{12}$ $2.9107 \times 10^{-8}$ $C_{14}$ $1.1778 \times 10^{-8}$
$C_{16}$ $1.4379 \times 10^{-7}$ Three-dimensional surface (8)

$C_5$ $1.6872$ $C_7$ $1.1294 \times 10^{-1}$ $C_8$ $1.4224 \times 10^{-1}$
$C_{10}$ $4.5371 \times 10^{-1}$ $C_{12}$ $6.1650 \times 10^{-3}$ $C_{14}$ $1.4675 \times 10^{-1}$
$C_{16}$ $2.9785 \times 10^{-5}$

| | X | Y | Z | α(°) |
|---|---|---|---|---|
| Displacement and tilt (1) | 0.0000 | 0.0000 | 9.0000 | -45.0000 |
| Displacement and tilt (2) | 0.0000 | 16.0000 | 9.0000 | 45.0000 |
| Displacement and tilt (3) | 0.0000 | 16.0000 | 0.0000 | 0.0000 |
| Displacement and tilt (4) | -16.0000 | 0.0000 | -1.0000 | 0.0000 |
| Displacement and tilt (5) | -16.0000 | 0.0000 | -9.0000 | 45.0000 |
| Displacement and tilt (6) | -16.0000 | -16.0000 | -9.0000 | -45.0000 |
| Displacement and tilt (7) | -16.0000 | -16.0000 | -1.0000 | 0.0000 |
| Displacement and tilt (8) | -16.0000 | -16.0000 | 53.5879 | 0.0000 |

EXAMPLE 4

| Surface No. | Radius of curvature | Surface separation | Refractive index | Abbe's No. |
|---|---|---|---|---|
| Object plane | $\infty$ | $\infty$ | | |
| 1 | Three-dimensional surface (1) Transmitting surface | | 1.52540 | 55.78 |
| 2 | Three-dimensional surface (2) Displacement and tilt (1) Reflecting surface | | 1.52540 | 55.78 |
| 3 | Three-dimensional surface (3) Displacement and tilt (2) Reflecting surface | | 1.52540 | 55.78 |
| 4 | Three-dimensional surface (4) Displacement and tilt (3) Transmitting surface | | | |
| 5 | Hypothetic plane (Coordinate transformation) | $\gamma = -90°$ | | |
| 6 | Three-dimensional surface (5) Displacement and tilt (4) Aperture (Diaphragm plane) Transmitting surface | | 1.52540 | 55.78 |
| 7 | Three-dimensional surface (6) Displacement and tilt (5) Reflecting surface | | 1.52540 | 55.78 |
| 8 | Three-dimensional surface (7) Displacement and tilt (6) Reflecting surface | | 1.52540 | 55.78 |
| 9 | Three-dimensional surface (8) Displacement and tilt (7) Transmitting surface | | | |
| Image plane | $\infty$ Displacement and tilt (8) | | | |

Three-dimensional surface (1)

$C_5$ $5.4177 \times 10^{-3}$ $C_7$ $9.0765 \times 10^{-3}$ $C_8$ $-7.2301 \times 10^{-6}$
$C_{10}$ $7.8054 \times 10^{-5}$ $C_{12}$ $3.1203 \times 10^{-6}$ $C_{14}$ $3.3945 \times 10^{-6}$
$C_{16}$ $-2.6158 \times 10^{-6}$ Three-dimensional surface (2)

$C_5$ $-8.6724 \times 10^{-4}$ $C_7$ $-4.7126 \times 10^{-4}$ $C_8$ $-1.0676 \times 10^{-5}$
$C_{10}$ $4.4208 \times 10^{-6}$ $C_{12}$ $-3.5592 \times 10^{-8}$ $C_{14}$ $2.1417 \times 10^{-7}$
$C_{16}$ $-6.4613 \times 10^{-7}$ Three-dimensional surface (3)

$C_5$ $-4.9621 \times 10^{-4}$ $C_7$ $-5.1478 \times 10^{-4}$ $C_8$ $-1.4168 \times 10^{-5}$
$C_{10}$ $-4.6223 \times 10^{-5}$ $C_{12}$ $-1.6551 \times 10^{-7}$ $C_{14}$ $-1.9654 \times 10^{-7}$
$C_{16}$ $-1.7943 \times 10^{-6}$ Three-dimensional surface (4)

$C_5$ $4.0099 \times 10^{-3}$ $C_7$ $-5.0153 \times 10^{-3}$ $C_8$ $-7.6126 \times 10^{-6}$
$C_{10}$ $-2.4184 \times 10^{-4}$ $C_{12}$ $4.2354 \times 10^{-6}$ $C_{14}$ $1.6559 \times 10^{-5}$
$C_{16}$ $-1.0877 \times 10^{-5}$ Three-dimensional surface (5)

$C_5$ $1.5616 \times 10^{-2}$ $C_7$ $2.2239 \times 10^{-2}$ $C_8$ $-4.9487 \times 10^{-4}$
$C_{10}$ $4.6623 \times 10^{-5}$ $C_{12}$ $-6.6355 \times 10^{-7}$ $C_{14}$ $-2.3443 \times 10^{-5}$
$C_{16}$ $-1.7264 \times 10^{-5}$ Three-dimensional surface (6)

$C_5$ $2.4847 \times 10^{-3}$ $C_7$ $1.9982 \times 10^{-3}$ $C_8$ $-2.3559 \times 10^{-5}$
$C_{10}$ $1.9553 \times 10^{-5}$ $C_{12}$ $4.8948 \times 10^{-7}$ $C_{14}$ $-1.0977 \times 10^{-6}$
$C_{16}$ $-2.7790 \times 10^{-6}$ Three-dimensional surface (7)

$C_5$ $4.0231 \times 10^{-4}$ $C_7$ $2.4728 \times 10^{-3}$ $C_8$ $2.0277 \times 10^{-5}$
$C_{10}$ $2.1493 \times 10^{-5}$ $C_{12}$ $-2.4306 \times 10^{-7}$ $C_{14}$ $-4.2267 \times 10^{-6}$
$C_{16}$ $-2.9463 \times 10^{-6}$ Three-dimensional surface (8)

$C_5$ $1.5588$ $C_7$ $-8.9439 \times 10^{-1}$ $C_8$ $5.8243 \times 10^{-1}$
$C_{10}$ $-7.3696 \times 10^{-1}$ $C_{12}$ $1.4114 \times 10^{-2}$ $C_{14}$ $-2.3933 \times 10^{-1}$
$C_{16}$ $1.9057 \times 10^{-2}$ -continued

|  | X | Y | Z | α(°) |
|---|---|---|---|---|
| Displacement and tilt (1) | 0.0000 | 0.0000 | 9.0000 | −45.0000 |
| Displacement and tilt (2) | 0.0000 | 16.0000 | 9.0000 | 45.0000 |
| Displacement and tilt (3) | 0.0000 | 16.0000 | 0.0000 | 0.0000 |
| Displacement and tilt (4) | −16.0000 | 0.0000 | −1.0000 | 0.0000 |
| Displacement and tilt (5) | −16.0000 | 0.0000 | −9.0000 | 45.0000 |
| Displacement and tilt (6) | −16.0000 | −16.0000 | −9.0000 | −45.0000 |
| Displacement and tilt (7) | −16.0000 | −16.0000 | −1.0000 | 0.0000 |
| Displacement and tilt (8) | −16.0000 | −16.0000 | 33.4746 | 0.0000 |

EXAMPLE 5

| Surface No. | Radius of curvature | | Surface separation | Refractive index | Abbe's No. |
|---|---|---|---|---|---|
| Object plane | ∞ | | ∞ | | |
| 1 | Diaphragm | 40.2088 | 2.85 | 1.57135 | 53.00 |
| 2 | plane | −26.8363 | 1.00 | 1.62004 | 36.30 |
| 3 | | −208.6676 | 32.04 | | |
| 4 | Three-dimensional surface (1) Transmitting surface | | | 1.52540 | 55.78 |
| 5 | Three-dimensional surface (2) Displacement and tilt (1) Reflecting surface | | | 1.52540 | 55.78 |
| 6 | ∞ Displacement and tilt (2) Reflecting surface (Roof plane) | | | 1.52540 | 55.78 |
| 7 | Three-dimensional surface (1) Reflecting surface | | | 1.52540 | 55.78 |
| 8 | Three-dimensional surface (2) Displacement and tilt (3) Transmitting surface | | | 1.52540 | 55.78 |
| 9 | Three-dimensional surface (3) Displacement and tilt (3) Transmitting surface | | | 1.52540 | 55.78 |
| 10 | Three-dimensional surface (4) Displacement and tilt (4) Reflecting surface | | | 1.52540 | 55.78 |
| 11 | Three-dimensional surface (3) Displacement and tilt (3) Reflecting surface | | | 1.52540 | 55.78 |
| 12 | Three-dimensional surface (5) Displacement and tilt (5) Transmitting surface | | 47.00 | | |
| 13 | Pupil plane ∞ | | | | |

Three-dimensional surface (1)

$C_5$ −5.1170 × 10$^{-3}$  $C_7$ 5.4601 × 10$^{-3}$  $C_8$ 8.8348 × 10$^{-5}$
$C_{10}$ −7.0524 × 10$^{-5}$

Three-dimensional surface (2)

$C_5$ −3.5395 × 10$^{-4}$  $C_7$ 6.7137 × 10$^{-3}$  $C_8$ 2.4288 × 10$^{-5}$
$C_{10}$ 5.0626 × 10$^{-5}$

Three-dimensional surface (3)

$C_5$ 6.5279 × 10$^{-3}$  $C_7$ 6.5488 × 10$^{-3}$  $C_8$ 3.1554 × 10$^{-5}$
$C_{10}$ −2.7768 × 10$^{-4}$

Three-dimensional surface (4)

$C_5$ −1.5323 × 10$^{-3}$  $C_7$ 4.1449 × 10$^{-3}$  $C_8$ −3.3932 × 10$^{-5}$
$C_{10}$ −6.6649 × 10$^{-4}$

Three-dimensional surface (5)

$C_5$ 1.0168 × 10$^{-2}$  $C_7$ −4.2969 × 10$^{-2}$  $C_8$ 1.2700 × 10$^{-3}$
$C_{10}$ −1.6990 × 10$^{-4}$

|  | X | Y | Z | α(°) |
|---|---|---|---|---|
| Displacement and tilt (1) | 0.0000 | 0.0000 | 11.0133 | −43.0410 |
| Displacement and tilt (2) | 0.0000 | 16.0426 | 9.9146 | 73.5412 |
| Displacement and tilt (3) | 0.0000 | 0.0000 | 17.5028 | −52.1590 |
| Displacement and tilt (4) | 0.0000 | −14.3013 | 13.8526 | −77.3392 |
| Displacement and tilt (5) | 0.0000 | 0.0000 | 32.0000 | 0.0000 |

EXAMPLE 6

| Surface No. | Radius of curvature | | Surface separation | Refractive index | Abbe's No. |
|---|---|---|---|---|---|
| Object plane | ∞ | | ∞ | | |
| 1 | Diaphragm | 57.40736 | 2.85 | 1.57135 | 53.00 |
| 2 | plane | −29.18273 | 1.00 | 1.62004 | 36.30 |
| 3 | | −276.39390 | 50.00 | | |
| 4 | Three-dimensional surface (1) Transmitting surface | | | 1.52540 | 55.78 |
| 5 | Three-dimensional surface (2) Displacement and tilt (1) Reflecting surface | | | 1.52540 | 55.78 |
| 6 | ∞ Displacement and tilt (2) Reflecting surface (Roof plane) | | | 1.52540 | 55.78 |
| 7 | Three-dimensional surface (1) Reflecting surface | | | 1.52540 | 55.78 |
| 8 | Three-dimensional surface (2) Displacement and tilt (1) Transmitting surface | | | | |
| 9 | Three-dimensional surface (3) Displacement and tilt (3) Transmitting surface | | | 1.52540 | 55.78 |
| 10 | Three-dimensional surface (4) Displacement and tilt (4) Reflecting surface | | | 1.52540 | 55.78 |
| 11 | Three-dimensional surface (3) Displacement and tilt (3) Reflecting surface | | | 1.52540 | 55.78 |
| 12 | Three-dimensional surface (5) Displacement and tilt (5) Transmitting surface | | 47.00 | | |
| 13 | Pupil plane ∞ | | | | |

Three-dimensional surface (1)

$C_5$ −8.0124 × 10$^{-4}$  $C_7$ 3.5709 × 10$^{-3}$  $C_8$ 7.0045 × 10$^{-5}$
$C_{10}$ 1.5193 × 10$^{-4}$

Three-dimensional surface (2)

$C_5$ −5.6592 × 10$^{-4}$  $C_7$ 2.0195 × 10$^{-3}$  $C_8$ −6.8568 × 10$^{-6}$
$C_{10}$ −1.6129 × 10$^{-5}$

Three-dimensional surface (3)

$C_5$ 4.0388 × 10$^{-3}$  $C_7$ 2.9239 × 10$^{-3}$  $C_8$ 3.2819 × 10$^{-5}$
$C_{10}$ −1.7712 × 10$^{-4}$

Three-dimensional surface (4)

$C_5$ −2.2833 × 10$^{-3}$  $C_7$ −9.9396 × 10$^{-4}$  $C_8$ 5.6528 × 10$^{-5}$
$C_{10}$ −3.1137 × 10$^{-4}$

Three-dimensional surface (5)

$C_5$ −3.2781 × 10$^{-3}$  $C_7$ −2.8737 × 10$^{-2}$  $C_8$ 5.3247 × 10$^{-4}$
$C_{10}$ −3.6264 × 10$^{-4}$

|  | X | Y | Z | α(°) |
|---|---|---|---|---|
| Displacement and tilt (1) | 0.0000 | 0.0000 | 15.4258 | −44.5092 |
| Displacement and tilt (2) | 0.0000 | 15.4803 | 15.1605 | 69.7460 |
| Displacement and tilt (3) | 0.0000 | 0.0000 | 17.5019 | −50.8056 |
| Displacement and tilt (4) | 0.0000 | −17.6277 | 13.8799 | −75.2844 |
| Displacement and tilt (5) | 0.0000 | 0.0000 | 32.0000 | 0.0000 |

EXAMPLE 7

| Surface No. | Radius of curvature | | Surface separation | Refractive index | Abbe's No. |
|---|---|---|---|---|---|
| Object plane | ∞ | | ∞ | | |
| 1 | Diaphragm plane | 40.20881 | 2.8500 | 1.57135 | 53.00 |
| 2 | | −26.83633 | 1.0000 | 1.62004 | 36.30 |
| 3 | | −208.66757 | 36.4737 | | |
| 4 | Three-dimensional surface (1) Transmitting surface | | | 1.52540 | 55.78 |
| 5 | Three-dimensional surface (2) Displacement and tilt (1) Reflecting surface | | | 1.52540 | 55.78 |
| 6 | ∞ Displacement and tilt (2) Reflecting surface (Roof plane) | | | 1.52540 | 55.78 |
| 7 | Three-dimensional surface (1) Reflecting surface | | | 1.52540 | 55.78 |
| 8 | Three-dimensional surface (2) Displacement and tilt (1) Transmitting surface | | | | |
| 9 | Three-dimensional surface (3) Displacement and tilt (3) Transmitting surface | | | 1.52540 | 55.78 |
| 10 | Three-dimensional surface (4) Displacement and tilt (4) Reflecting surface | | | 1.52540 | 55.78 |
| 11 | Three-dimensional surface (3) Displacement and tilt (3) Reflecting surface | | | 1.52540 | 55.78 |
| 12 | Three-dimensional surface (5) Displacement and tilt (5) Transmitting surface | | 38.50 | | |
| 13 | Pupil plane ∞ | | | | |

Three-dimensional surface (1)

| $C_5$ | $1.0075 \times 10^{-4}$ | $C_7$ | $1.0092 \times 10^{-2}$ | $C_8$ | $-2.0216 \times 10^{-5}$ |
|---|---|---|---|---|---|
| $C_{10}$ | $-3.4679 \times 10^{-4}$ | $C_{19}$ | $1.1788 \times 10^{-6}$ | $C_{21}$ | $-8.3759 \times 10^{-8}$ |

Three-dimensional surface (2)

| $C_5$ | $1.9124 \times 10^{-3}$ | $C_7$ | $1.0537 \times 10^{-2}$ | $C_8$ | $1.1835 \times 10^{-5}$ |
|---|---|---|---|---|---|
| $C_{10}$ | $1.0534 \times 10^{-4}$ | $C_{19}$ | $-1.0093 \times 10^{-6}$ | $C_{21}$ | $1.0960 \times 10^{-9}$ |

Three-dimensional surface (3)

| $C_5$ | $5.4260 \times 10^{-3}$ | $C_7$ | $1.0910 \times 10^{-2}$ | $C_8$ | $-2.8195 \times 10^{-5}$ |
|---|---|---|---|---|---|
| $C_{10}$ | $-3.9250 \times 10^{-4}$ | $C_{19}$ | $-3.8373 \times 10^{-7}$ | $C_{21}$ | $6.6095 \times 10^{-7}$ |

Three-dimensional surface (4)

| $C_5$ | $1.7412 \times 10^{-2}$ | $C_7$ | $4.7151 \times 10^{-2}$ | $C_8$ | $-2.9002 \times 10^{-4}$ |
|---|---|---|---|---|---|
| $C_{10}$ | $-2.9542 \times 10^{-3}$ | $C_{19}$ | $8.2390 \times 10^{-7}$ | $C_{21}$ | $1.0595 \times 10^{-5}$ |

Three-dimensional surface (5)

| $C_5$ | $-8.7296 \times 10^{-3}$ | $C_7$ | $-2.7968 \times 10^{-2}$ | $C_8$ | $5.2341 \times 10^{-4}$ |
|---|---|---|---|---|---|
| $C_{10}$ | $3.8379 \times 10^{-4}$ | | | | |

| | X | Y | Z | α(°) |
|---|---|---|---|---|
| Displacement and tilt (1) | 0.0000 | 0.0000 | 10.3157 | −43.7563 |
| Displacement and tilt (2) | 0.0000 | 15.4949 | 9.6426 | 73.5401 |
| Displacement and tilt (3) | 0.0000 | 0.0000 | 14.3666 | −51.3141 |
| Displacement and tilt (4) | 0.0000 | −20.4981 | −8.7946 | −59.7321 |
| Displacement and tilt (5) | 0.0000 | 0.0000 | 28.0000 | 0.0000 |

EXAMPLE 8

| Surface No. | Radius of curvature | Surface separation | Refractive index | Abbe's No. |
|---|---|---|---|---|
| Object plane | ∞ | ∞ | | |
| 1 | Diaphragm plane ∞ | 2.85 | | |
| 2 | Three-dimensional surface (1) Transmitting surface | | 1.52540 | 55.78 |
| 3 | Three-dimensional surface (2) Displacement and tilt (1) Reflecting surface | | 1.52540 | 55.78 |
| 4 | ∞ Displacement and tilt (2) Reflecting surface (Roof plane) | | 1.52540 | 55.78 |
| 5 | Three-dimensional surface (1) Reflecting surface | | 1.52540 | 55.78 |
| 6 | Three-dimensional surface (2) Displacement and tilt (1) Transmitting surface | | | |
| 7 | Three-dimensional surface (3) Displacement and tilt (3) Transmitting surface | | 1.52540 | 55.78 |
| 8 | Three-dimensional surface (4) Displacement and tilt (4) Reflecting surface | | 1.52540 | 55.78 |
| 9 | Three-dimensional surface (3) Displacement and tilt (3) Reflecting surface | | 1.52540 | 55.78 |
| 10 | Three-dimensional surface (5) Displacement and tilt (5) Transmitting surface | 47.00 | | |
| 11 | Pupil plane ∞ | | | |

Three-dimensional surface (1)

| $C_5$ | $-1.0238 \times 10^{-2}$ | $C_7$ | $-8.7566 \times 10^{-3}$ | $C_8$ | $6.1803 \times 10^{-4}$ |
|---|---|---|---|---|---|
| $C_{10}$ | $5.8372 \times 10^{-4}$ | $C_{12}$ | $-1.5484 \times 10^{-5}$ | $C_{14}$ | $-1.4220 \times 10^{-4}$ |
| $C_{16}$ | $6.9201 \times 10^{-5}$ | | | | |

Three-dimensional surface (2)

| $C_5$ | $-5.8544 \times 10^{-3}$ | $C_7$ | $-8.5976 \times 10^{-3}$ | $C_8$ | $6.6193 \times 10^{-6}$ |
|---|---|---|---|---|---|
| $C_{10}$ | $1.5859 \times 10^{-5}$ | $C_{12}$ | $-1.7087 \times 10^{-6}$ | $C_{14}$ | $-1.2171 \times 10^{-5}$ |
| $C_{16}$ | $1.6010 \times 10^{-5}$ | | | | |

Three-dimensional surface (3)

| $C_5$ | $4.0501 \times 10^{-3}$ | $C_7$ | $-1.2637 \times 10^{-2}$ | $C_8$ | $3.6229 \times 10^{-5}$ |
|---|---|---|---|---|---|
| $C_{10}$ | $2.9641 \times 10^{-4}$ | $C_{12}$ | $-1.3289 \times 10^{-6}$ | $C_{14}$ | $8.4366 \times 10^{-6}$ |
| $C_{16}$ | $-2.5567 \times 10^{-6}$ | | | | |

Three-dimensional surface (4)

| $C_5$ | $-7.0965 \times 10^{-3}$ | $C_7$ | $-1.0519 \times 10^{-2}$ | $C_8$ | $1.2984 \times 10^{-4}$ |
|---|---|---|---|---|---|
| $C_{10}$ | $2.0445 \times 10^{-4}$ | $C_{12}$ | $-6.7952 \times 10^{-6}$ | $C_{14}$ | $9.4012 \times 10^{-8}$ |
| $C_{16}$ | $2.1245 \times 10^{-5}$ | | | | |

Three-dimensional surface (5)

| $C_5$ | $6.6838 \times 10^{-3}$ | $C_7$ | $-7.8781 \times 10^{-2}$ | $C_8$ | $-6.8022 \times 10^{-5}$ |
|---|---|---|---|---|---|
| $C_{10}$ | $-1.2206 \times 10^{-3}$ | | | | |

| | X | Y | Z | α(°) |
|---|---|---|---|---|
| Displacement and tilt (1) | 0.0000 | 0.0000 | 11.8225 | −45.0969 |
| Displacement and tilt (2) | 0.0000 | 13.1112 | 11.8668 | 70.5805 |
| Displacement and tilt (3) | 0.0000 | 0.0000 | 18.8401 | −55.8591 |
| Displacement and tilt (4) | 0.0000 | −18.7933 | 11.3545 | −83.6714 |
| Displacement and tilt (5) | 0.0000 | 0.0000 | 32.0000 | 0.0000 |

Transverse aberration diagrams of Examples 1 and 3 are attached hereto as FIGS. 5–6, and 7–8, respectively, in which the bracketed numerical values show the (horizontal (X-direction), and vertical (Y-direction) field angles), and show transverse aberrations at those field angles.

Set out below are values for parameters concerning conditions (1-1) to (13-1) in Examples 1 to 4. In the "surface" column, 1-1, for instance, is understood to mean the first reflecting surface of the first prism. Similarly, 2-t1, for instance, is understood to mean the first transmitting surface of the second prism.

| Condition | Surface | Example 1 | Surface | Example 2 |
|---|---|---|---|---|
| 1-1 | 1-2 | −0.231 | 1-2 | −1.508 |
|  | 2-1 | −0.403 | 2-1 | −0.363 |
|  | 2-3 | −0.686 | 2-2 | −0.617 |
| 2-1 | 1-2 | 0.385 | 1-2 | 0.354 |
| 3-1 | 2-1 | 0.249 | 2-1 | 0.214 |
| 4-1 | 2-3 | 0.664 | 2-2 | 0.234 |
| 5-1 |  | 0.004 |  | 0.013 |
| 5-2 |  | 0.005 |  | 0.006 |
| 6-1 |  | 1.543 |  | 1.655 |
| 7-1 | 1-1 | 0.005 | 1-1 | 0.006 |
| 7-2 | 1-2 | −0.003 | 1-2 | −0.004 |
| 7-3 | 2-1 | 0.003 | 2-1 | 0.004 |
| 8-1 | 1-2 | 0.029 | 1-2 | 0.002 |
| 8-2 | 2-1 | −0.039 | 2-1 | −0.039 |
| 8-3 | 2-3 | 0.005 | 2-2 | 0.021 |
| 9-1 | Ftmin | 64.3 | Ftmin | 40.2 |
|  | Frmin | 51.7 | Frmin | 40 |
| 10-1 | 2-1 | 2.771 |  |  |
|  | 2-2 | 1.535 |  |  |
| 11-1 | 2-tl | 0.595 |  |  |
| 12-1 |  |  | 2-1 | −0.002 |
|  |  |  | 2-2 | −0.005 |
| 12-2 |  |  |  | 0.002 |
| 13-1 |  |  | 2-1 | −0.006 |
|  |  |  | 2-2 | −0.014 |

Figure 17:
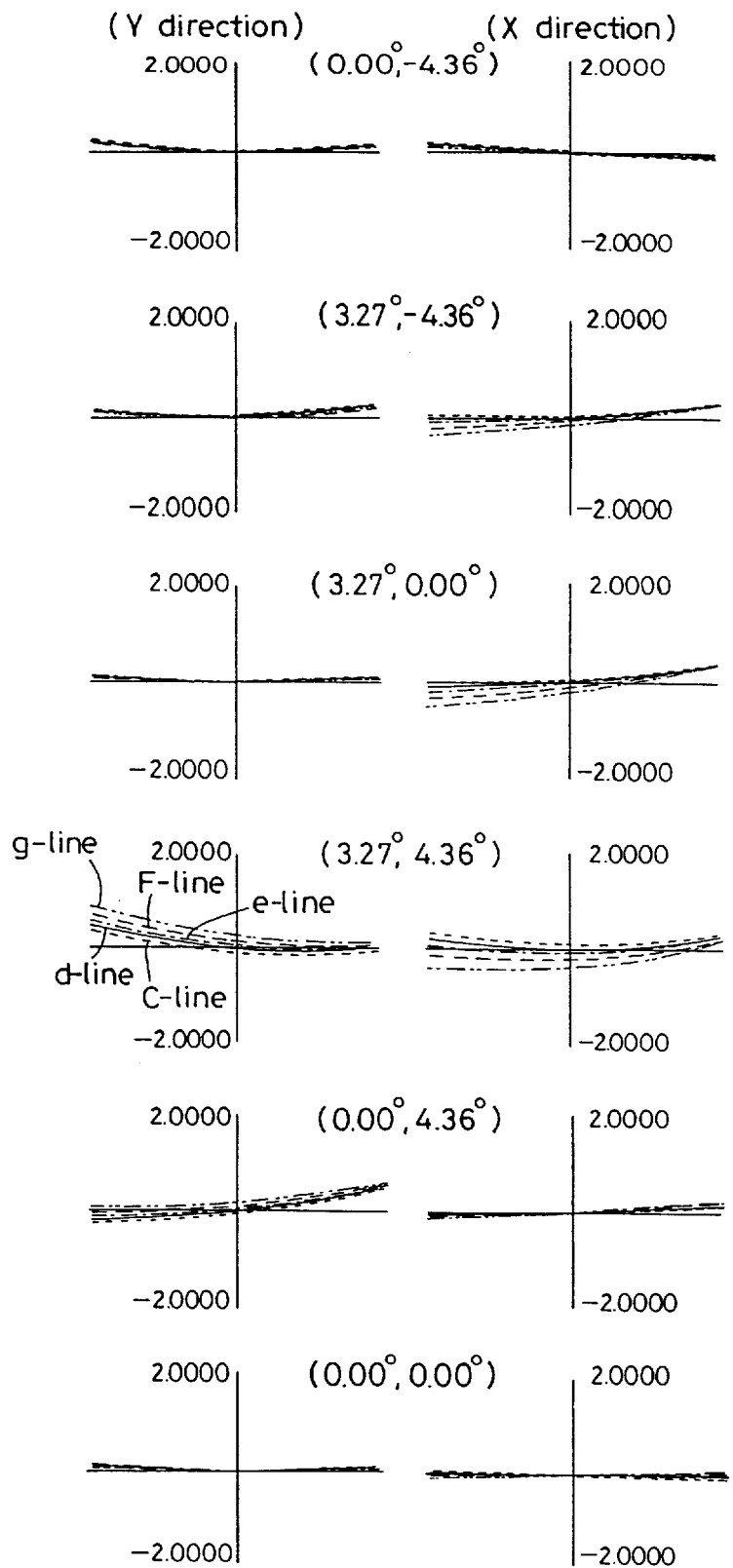
FIG. 17 is a transverse aberration diagram of the prism optical system according to Example 5 of the present invention.
Figure 18:
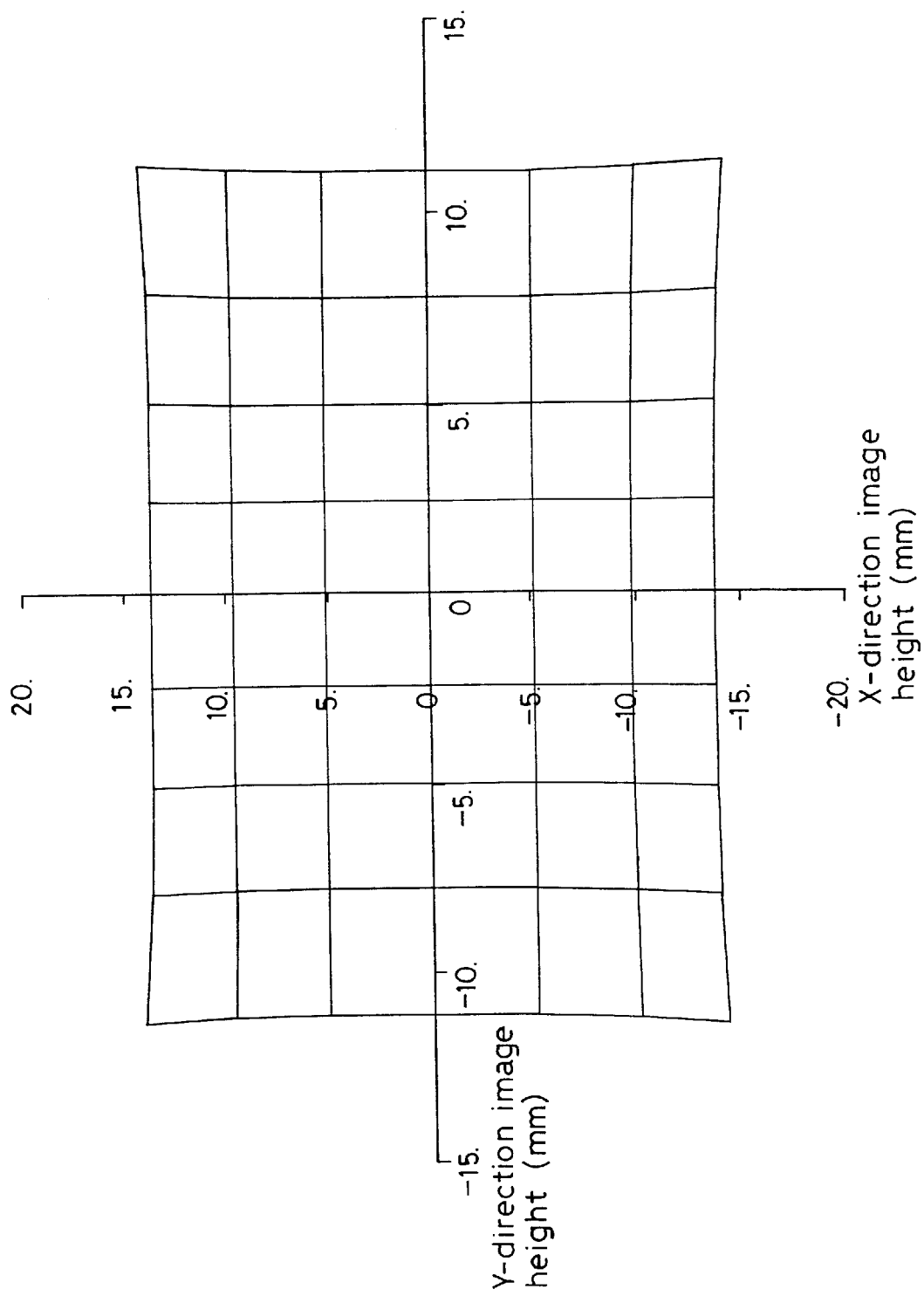
FIG. 18 is an aberration diagram showing image distortion of the prism optical system according to Example 5 of the present invention.
Figure 19:
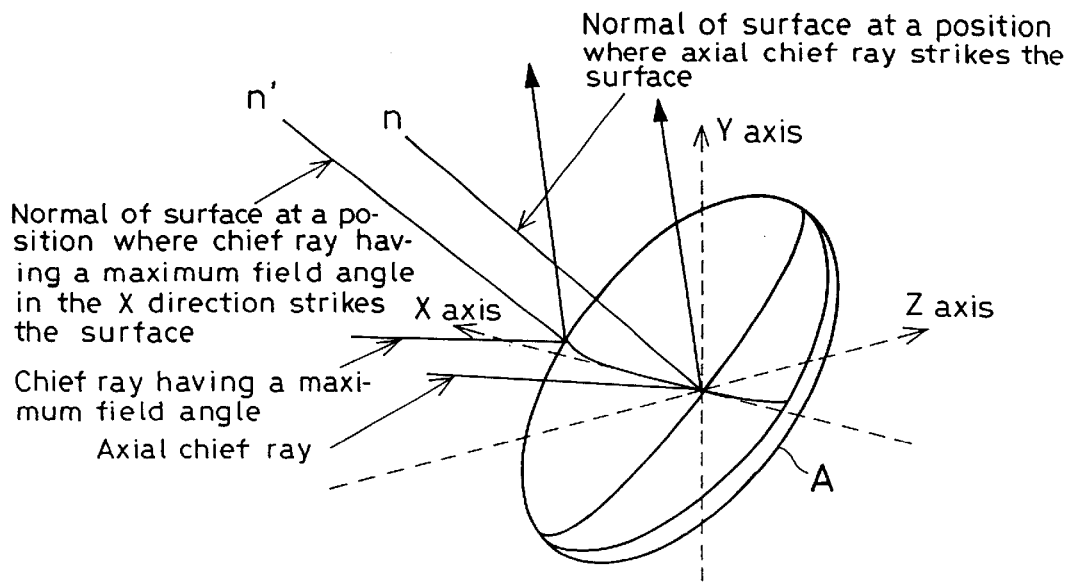
FIGS. 19(a) and 19(b), referred to collectively as FIG. 19, are schematics illustrative of a parameter DY used in the second aspect of the present invention.
Figure 19:
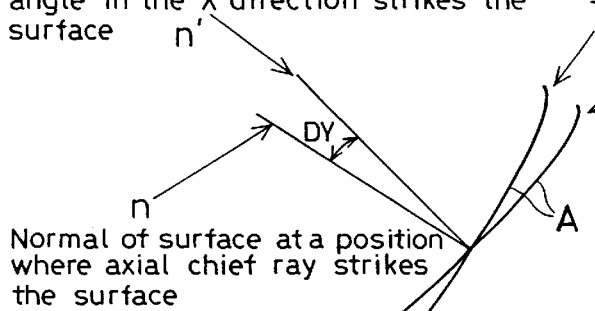

A transverse aberration diagram of Example 5 is attached thereto as FIG. 17, in which the bracketed numerical values represent the (horizontal (X-direction) field angles, and vertical (Y-direction) field angles), and show transverse aberrations at those field angles. Also, an image distortion diagram of Example 5 is attached hereto as FIG. 16.

Tabulated below are values for conditions (1) to (29) in Examples 5 to 8.

|  | Example 1 | Example 2 | Example 3 | Example 4 |
|---|---|---|---|---|
| Px1 | −0.040721 | −0.012249 | −0.063910 | 0.052147 |
| Px2 | 0.031926 | 0.020124 | 0.057203 | −0.062056 |
| Px3 | −0.025140 | 0.006029 | 0.034122 | 0.063801 |
| Px4 | 0.039721 | 0.017734 | 0.066173 | −0.076647 |
| Py1 | 0.002147 | 0.003432 | −0.011599 | 0.035509 |
| Py2 | −0.026572 | −0.006982 | −0.000099 | −0.083605 |
| Py3 | 0.009294 | 0.013849 | 0.001348 | 0.043043 |
| Py4 | 0.039594 | 0.024497 | 0.032910 | 0.024565 |
| Cx1 | −0.000911 | 0.000607 | −0.001572 | −0.000071 |
| Cx2 | 0.002329 | −0.008083 | 0.008951 | −0.020189 |
| Cx3 | 0.028063 | 0.014140 | 0.058251 | −0.010683 |
| Cx4 | 0.018191 | 0.011272 | 0.023192 | −0.013198 |
| DY1 | 0.000268 | −0.000403 | 0.000630 | 0.000007 |
| DY2 | −0.001591 | 0.009008 | −0.010301 | 0.024559 |
| DY3 | −0.017200 | −0.018141 | −0.041259 | 0.004517 |
| DY4 | −0.010366 | −0.008580 | −0.010397 | 0.002941 |
| Px34 | −0.632925 | 0.339943 | 0.515651 | −0.832397 |
| Py34 | 0.234731 | 0.565341 | 0.040955 | 1.752179 |

In the examples mentioned above, each surface is constructed of a three-dimensional surface according to defining polynomial (a) herein set forth, but three-dimensional surfaces conforming to all available definitions may be used in the present invention. Whatever definitions are taken, however, it is understood that a prism optical system with very well-corrected aberrations can be obtained by satisfying any one or some of the conditions set forth herein. Note that any conditions used in conventional non-decentered systems such as the curvature, focal length, etc. of a surface defined by a surface-defining coordinate system taking no account of decentering are insignificant in the case where, as contemplated in the present invention, each surface is located in a greatly decentered manner.

An actual stop may be located at a position corresponding to an aperture or stop surface. Alternatively, light rays may be blocked by a prism barrel, light-blocking means, etc.

According to the present invention directed to the examples shown in FIGS. 1 and 2, it is possible to obtain an inverted image by constructing the second reflecting surface of the second prism using a roof surface. It is thus possible to obtain an inverted image by use of the present prism optical system free from any image-forming lens.

Figure 11:
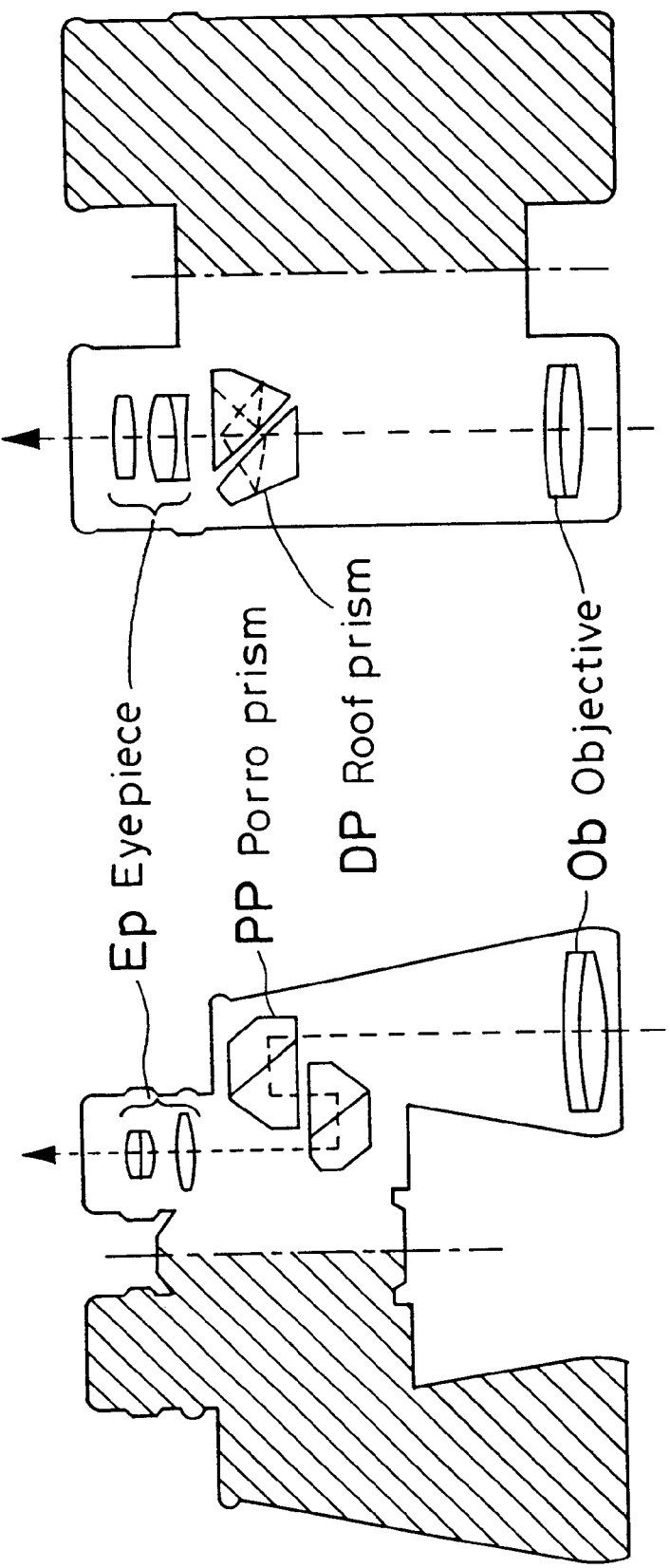
FIGS. 11(a) and 11(b) are schematics illustrative of binocular optical systems to which the first aspect of the present invention is applicable.

FIGS. 11(a) and 11(b) show two binocular optical systems with (a) and (b) of the figures being of Porro, and roof prism types, respectively. By using the prism optical system having an image-forming action according to the present invention as a Porro prism PP or a roof prism DP, it is possible to design a binocular capable of dispensing with an objective Ob and/or an eyepiece EP. By using the roof prism according to the present invention in this case, it is possible to design a binocular having a short overall length. With the Porro prism according to the present invention it is also possible to design a thin type binocular.

Figure 12:
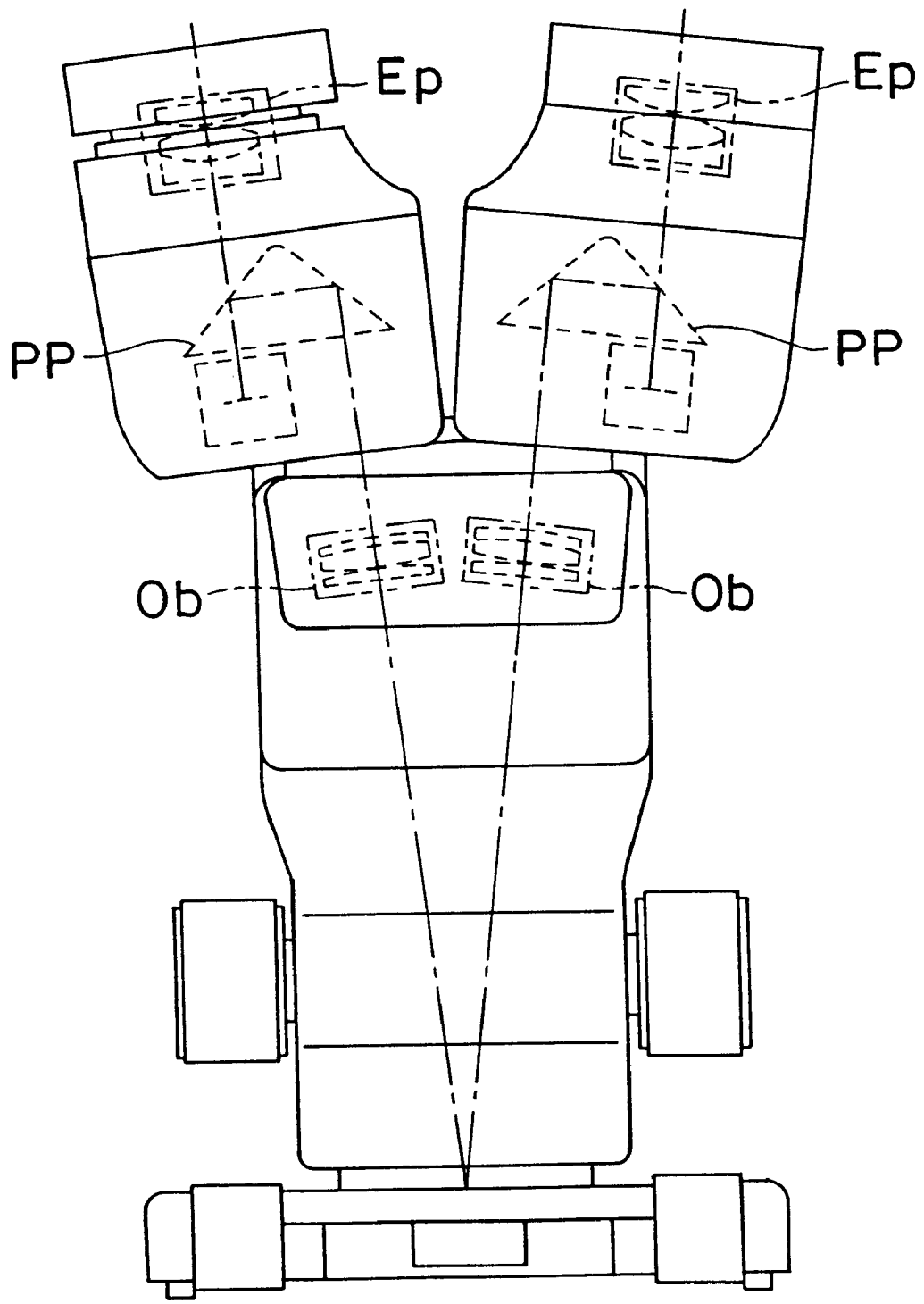
FIG. 12 is a schematic illustrative of a binocular microscope optical system to which the first aspect of the present invention is applicable.

FIG. 12 illustrates a binocular microscope system. By using the prism optical system having an image-forming action according to the first aspect of the present invention as a Porro prism PP for the adjustment of optical axis, and image distortions, it is possible to design a binocular microscope capable of dispensing with an objective Ob and/or an eyepiece Ep.

In addition to binoculars and binocular microscopes, the present invention may be applicable to monocles and monocular microscopes. Moreover, if the first aspect of the present invention is applied to a finder optical system for cameras, etc., it is then possible to design compact cameras.

Further, it is possible to make use of a combination of prism optical systems according to the first aspect of the present invention. Still further, it is possible to achieve wide-angle systems, or systems having a decreased F-number by locating lenses before and after the optical system according to the first aspect of the present invention or between the first prism and the second prism. Yet still further, it is possible to design a zooming system by varying the relative position of the present optical system with respect to other lens system.

FIGS. 20(a) and 20(b) illustrate two binocular optical systems with (a) and (b) of the figures being of Schmidt (roof), and Porro prism types, respectively. The second aspect of the present invention has been described on the assumption that the action of an ocular optical system Ep is imparted to a Schmidt or inverting prism SP in the optical system shown in FIG. 20(a). It is understood, however, that it is possible to design a binocular capable of dispensing with the ocular optical system Ep or an objective optical system Ob by imparting the actions of the ocular and objective optical systems Ep and Ob to a Porro or inverting prism PP in the optical system shown in FIG. 20(b). If, in this case, the Schmidt prism type according to the second aspect of the present invention is used, it is then possible to design a binocular having a short overall length. Also, if the Porro prism type according to the second aspect of the present invention is used, it is then possible to design a thin type binocular.

It is understood that the prism optical system according to the second aspect of the present invention, too, is applicable to not only binoculars but also binocular microscopes, monocles, and monocular microscopes. Moreover, if the second aspect of the present invention is applied to a finder optical system for cameras, etc., it is then possible to design compact cameras.

Further, it is possible to make use of a combination of prism optical systems according to the second aspect of the present invention. Still further, it is possible to achieve wide-angle systems, or systems having a decreased F-number by locating lenses before and after the optical system according to the second aspect of the present invention or between the first prism and the second prism. Yet still further, it is possible to design a zooming system by varying the relative position of the present optical system with respect to other lens system.

As can be clearly understood from the foregoing explanation, the first aspect of the present invention makes it possible to provide a prism optical system which has an image-forming action and forms a clear image substantially free from distortion even at a wide field angle.

According to the second aspect of the present invention, it is possible to provide a prism optical system which has a combined inverting prism and eyepiece action, and forms a clear image substantially free from distortion even at a wide field angle.

What we claim is:

1. A prism optical system for image inversion comprising at least two prisms, wherein:
   at least one of said prisms is constructed of a curved surface having at least two surfaces of a rotationally asymmetric surface shape and having no rotationally symmetric axis both within and outside said surfaces,
   at least one of said at least two surfaces acting as a reflecting surface having a reflecting action to make correction for rotationally asymmetric aberration produced due to decentering by said rotationally asymmetric surface shape, and
   said inverting prism optical system having a finite focal length so as to act as an ocular optical system.

2. The prism optical system of claim 1, which has an optical path substantially identical with that in a Schmidt prism, and in which one of said two prisms has a substantially intersecting optical path and comprises a roof surface, whereas another prism has an optical path that does not intersect.

3. The prism optical system of claim 2, which includes on an objective side thereof a prism having a substantially intersecting optical path and comprising a roof surface, and on an observer's pupil side thereof a prism having an optical path that does not intersect.

4. A prism optical system for image inversion comprising at least two prisms, wherein:
   at least one of said prisms is constructed of a curved surface having at least two surfaces of a rotationally asymmetric surface shape and having no rotationally symmetric axis both within and outside said surfaces,
   at least one of said at least two surfaces acting as a reflecting surface having a reflecting action to make correction for rotationally asymmetric aberration produced due to decentering by said rotationally asymmetric surface shape, and
   said inverting prism optical system having a finite focal length so as to act as an ocular optical system, and comprising a diffusing surface in the vicinity of a primary image-forming position therein.

5. The prism optical system of any one of claims 1 to 4, which has a curved surface shape having only one symmetric plane wherein, on condition that said rotationally asymmetric surface is defined by polynomial (a) given below, a coefficient $C_m[x^{n+1}]$ with respect to an odd-numbered term for x or $x^{n+1}$ where n is an integer satisfies condition (30):

$$C_m[x^{n+1}] = 0 \tag{30}$$

$$Z = C_2 + C_3 y + C_4 x + C_5 y^2 + C_6 yx + C_7 x^2 + C_8 y^3 + \tag{a}$$
$$C_9 y^2 x + C_{10} yx^2 + C_{11} x^3 + C_{12} y^4 +$$
$$C_{13} y^3 x + C_{14} y^2 x^2 + C_{15} yx^3 + C_{16} x^4 + C_{17} y^5 +$$
$$C_{18} y^4 x + C_{19} y^3 x^2 + C_{20} y^2 x^3 + C_{21} yx^4 + C_{22} x^5 +$$
$$C_{23} y^6 + C_{24} y^5 x + C_{25} y^4 x^2 + C_{26} y^3 x^3 + C_{27} y^2 x^4 +$$
$$C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7 \ldots$$

where $C_m$ is a coefficient provided that m is an integer of 2 or more.

6. The prism optical system of any one of claims 1 to 4, which has a curved surface shape having only one substantially symmetric plane wherein, on condition that said rotationally asymmetric surface is defined by polynomial (a) given below, a coefficient $C_m[x^{n+1}]$ with respect to an odd-numbered term for x or $x^{n+1}$ where n is an integer satisfies condition (31):

$$-5.0 \times 10^{-4} < C_m[x^{n+1}] < 5.0 \times 10^{-4} \tag{31}$$

$$Z = C_2 + C_3 y + C_4 x + C_5 y^2 + C_6 yx + C_7 x^2 + C_8 y^3 + \tag{a}$$
$$C_9 y^2 x + C_{10} yx^2 + C_{11} x^3 + C_{12} y^4 +$$
$$C_{13} y^3 x + C_{14} y^2 x^2 + C_{15} yx^3 + C_{16} x^4 + C_{17} y^5 +$$
$$C_{18} y^4 x + C_{19} y^3 x^2 + C_{20} y^2 x^3 + C_{21} yx^4 + C_{22} x^5 +$$
$$C_{23} y^6 + C_{24} y^5 x + C_{25} y^4 x^2 + C_{26} y^3 x^3 + C_{27} y^2 x^4 +$$
$$C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7 \ldots$$

where $C_m$ is a coefficient provided that m is an integer of 2 or more.

7. The prism optical system of any one of claims 1 to 4, which has a symmetric plane-free asymmetric polynominal surface or APS wherein, on condition that said rotationally asymmetric surface is defined by polynomial (a) given below, a coefficient $C_m[x^{n+1}]$ with respect to an odd-numbered term for x or $x^{n+1}$ where n is an integer satisfies condition (32-1) or (32-2):

$$-1.0 \times 10^{10} < C_m[x^{n+1}] < 1.0 \times 10^{10} \tag{32-1}$$

$$Cm[x^{n+1}] \neq 0 \tag{32-2}$$

$$Z = C_2 + C_3 y + C_4 x + C_5 y^2 + C_6 yx + C_7 x^2 + C_8 y^3 + \tag{a}$$
$$C_9 y^2 x + C_{10} yx^2 + C_{11} x^3 + C_{12} y^4 +$$
$$C_{13} y^3 x + C_{14} y^2 x^2 + C_{15} yx^3 + C_{16} x^4 + C_{17} y^5 +$$
$$C_{18} y^4 x + C_{19} y^3 x^2 + C_{20} y^2 x^3 + C_{21} yx^4 + C_{22} x^5 +$$
$$C_{23} y_6 + C_{24} y^5 x + C_{25} y^4 x^2 + C_{26} y^3 x^3 + C_{27} y^2 x^4 +$$
$$C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7 \ldots$$

where $C_m$ is a coefficient provided that m is an integer of 2 or more.

8. The prism optical system of claim 2 or 3, which satisfies condition (1):

$$-0.2 < Px3 < 0.2 \tag{1}$$

where, on condition that an axial chief ray is defined by a light ray leaving a center of an object and reaching a center of an exit pupil upon passing through a center of a stop, a Y-axis direction is defined by a direction within a decentered surface portion of a surface, an X-axis direction is defined by a direction perpendicular to said Y-axis direction, and a Z axis is defined by an axis that forms an orthogonal coordinate system with X and Y axes, Px3 represents an X-direction power of a transmitting action-free reflecting surface of said prism having an optical path that does not intersect.

9. The prism optical system of claim 2 or 3, which satisfies condition (2):

$$-0.2 < Py3 < 0.2 \tag{2}$$

where, on condition that an axial chief ray is defined by a light ray leaving a center of an object and reaching a center of an exit pupil upon passing through a center of a stop, a Y-axis direction is defined by a direction within a decentered surface portion of a surface, an X-axis direction is defined by a direction perpendicular to said Y-axis direction, and a Z axis is defined by an axis that forms an orthogonal coordinate system with X and Y axes, Py3 represents a Y-direction power of a transmitting action-free reflecting surface of said prism having an optical path that does not intersect.

10. The prism optical system of any one of claims 1 to 4, which comprises at least four reflecting surfaces.

11. The prism optical system of claim 10 in which a fourth surface having a reflecting action or a fourth reflecting surface, as counted from an object side of said prism optical system, has both a reflecting action and a transmitting action.

12. The prism optical system of claim 10, in which a fourth reflecting surface is constructed of a total reflecting surface.

13. The prism optical system of claim 12, which satisfies condition (9):

$$-0.2 < Px4 < 0.2 \tag{9}$$

where, on condition that an axial chief ray is defined by a light ray leaving a center of an object and reaching a center of an exit pupil upon passing through a center of a stop, a Y-axis direction is defined by a direction within a decentered surface portion of a surface, an X-axis direction is defined by a direction perpendicular to said Y-axis direction, and a Z axis is defined by an axis that forms an orthogonal coordinate system with X and Y axes, Px4 represents an X-direction power of said fourth reflecting surface.

14. The prism optical system of claim 12, which satisfies condition (10):

$$-0.2 < Py4 < 0.2 \tag{10}$$

where, on condition that an axial chief ray is defined by a light ray leaving a center of an object and reaching a center of an exit pupil upon passing through a center of a stop, a Y-axis direction is defined by a direction within a decentered surface portion of a surface, an X-axis direction is defined by a direction perpendicular to said Y-axis direction, and a Z axis is defined by an axis that forms an orthogonal coordinate system with X and Y axes, Py4 represents a Y-direction power of said fourth reflecting surface.

15. The prism optical system of any one of claims 1 to 4, which comprises three reflecting surfaces.

16. The prism optical system of claim 15, which satisfies condition (17):

$$-0.1 < Cx3 < 0.2 \tag{17}$$

where, on condition that an axial chief ray is defined by a light ray leaving a center of an object and reaching a center of an exit pupil upon passing through a center of a stop, a Y-axis direction is defined by a direction within a decentered surface portion of a surface, an X-axis direction is defined by a direction perpendicular to said Y-axis direction, a Z axis is defined by an axis that forms an orthogonal coordinate system with X and Y axes, and a third surface having a reflecting action or a third reflecting surface, as counted from an object side of said prism optical system, is located in said prism optical system in a decentered manner, Cx3 represents a difference in X-direction curvature between portions of said third reflecting surface in a Y-Z surface, which a Y-axis positive direction chief ray having a maximum field angle and a Y-axis negative direction chief ray having a maximum field angle strike.

17. The prism optical system of claim 15, which satisfies condition (19):

$$-0.1 < Cx4 < 0.1 \tag{19}$$

where, on condition that an axial chief ray is defined by a light ray leaving a center of an object and reaching a center of an exit pupil upon passing through a center of a stop, a Y-axis direction is defined by a direction within a decentered surface portion of a surface, an X-axis direction is defined by a direction perpendicular to said Y-axis direction, a Z axis is defined by an axis that forms an orthogonal coordinate system with X and Y axes, and a fourth surface having a reflecting action or a fourth reflecting surface, as counted from an object side of said prism optical system, is located in said prism optical system in a decentered manner, Cx4 represents a difference in X-direction curvature between portions of said fourth reflecting surface in a Y-Z surface, which a Y-axis positive direction chief ray having a maximum field angle and a Y-axis negative direction chief ray having a maximum field angle strike.

18. The prism optical system of claim 15, which satisfies condition (21):

$$-0.1 < DY3 < 0.1 \tag{21}$$

where, on condition that an axial chief ray is defined by a light ray leaving a center of an object and reaching a center of an exit pupil upon passing through a center of a stop, a Y-axis direction is defined by a direction within a decentered surface portion of a surface, an X-axis direction is defined by a direction perpendicular to said Y-axis direction, and a Z axis is defined by an axis that forms an orthogonal coordinate system with X and Y axes, DY3 represents a difference between a value for tangent of a normal of said decentered surface within a Y-Z surface as found at a position of a third surface having a reflecting surface or a third reflecting surface as counted from an object side of said prism optical system, which an X-direction axial chief ray having a maximum field angle strikes and a value for tangent of the normal of the decentered surface within the Y-Z surface as found at a position of said reflecting surface which said axial chief ray strikes.

19. The prism optical system of claim 15, which satisfies condition (23):

$$-0.1 < DY4 < 0.1 \tag{23}$$

where, on condition that an axial chief ray is defined by a light ray leaving a center of an object and reaching a center of an exit pupil upon passing through a center of a stop, a Y-axis direction is defined by a direction within a decentered surface portion of a surface, an X-axis direction is defined by a direction perpendicular to said Y-axis direction, and a Z axis is defined by an axis that forms an orthogonal coordinate system with X and Y axes, DY3 represents a difference between a value for tangent of a normal of said decentered surface within a Y-Z surface as found at a position of a fourth surface having a reflecting surface or a fourth reflecting surface as counted from an object side of said prism optical system, which an X-direction axial chief ray having a maximum field angle strikes and a value for tangent of the normal of the decentered surface within the Y-Z surface as found at a position of said reflecting surface which said axial chief ray strikes.

* * * * *